US010541454B2

(12) United States Patent
Nishimura et al.

(10) Patent No.: US 10,541,454 B2
(45) Date of Patent: Jan. 21, 2020

(54) ENERGY STORAGE APPARATUS

(71) Applicants: GS Yuasa International Ltd., Kyoto-shi, Kyoto (JP); Honda Motor Co., Ltd., Tokyo (JP)

(72) Inventors: Yosuke Nishimura, Kyoto (JP); Motoki Hoshino, Kyoto (JP); Masao Kawata, Saitama (JP); Jun Machida, Saitama (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 1203 days.

(21) Appl. No.: 14/814,087

(22) Filed: Jul. 30, 2015

(65) Prior Publication Data

US 2016/0036101 A1 Feb. 4, 2016

(30) Foreign Application Priority Data

Jul. 30, 2014 (JP) ................................ 2014-155013
Jul. 30, 2014 (JP) ................................ 2014-155016

(51) Int. Cl.

*H01M 10/61* (2014.01)
*H01M 2/10* (2006.01)
*H01M 10/617* (2014.01)
*H01M 10/625* (2014.01)
*H01M 10/651* (2014.01)
*H01M 10/6557* (2014.01)

(52) U.S. Cl.

CPC ....... *H01M 10/617* (2015.04); *H01M 2/1016* (2013.01); *H01M 2/1072* (2013.01); *H01M 2/1077* (2013.01); *H01M 2/1083* (2013.01); *H01M 10/625* (2015.04); *H01M 10/651* (2015.04); *H01M 10/6557* (2015.04)

(58) Field of Classification Search

None
See application file for complete search history.

(56) References Cited

U.S. PATENT DOCUMENTS

| | | | |
|---|---|---|---|
| 8,163,419 B2 | 4/2012 | Marukawa et al. |
| 2003/0211384 A1 | 11/2003 | Hamada et al. |
| 2010/0099023 A1 | 4/2010 | Kuroda et al. |
| 2010/0151309 A1 | 6/2010 | Marukawa et al. |
| 2010/0297486 A1 | 11/2010 | Fujii |

(Continued)

FOREIGN PATENT DOCUMENTS

| | | |
|---|---|---|
| JP | 2003-331932 A | 11/2003 |
| JP | 2004-047426 A | 2/2004 |

(Continued)

*Primary Examiner* — Scott J. Chmielecki
(74) *Attorney, Agent, or Firm* — McGinn IP Law Group, PLLC

(57) ABSTRACT

An energy storage apparatus includes: a plurality of energy storage devices arranged in a row in a first direction; and a plurality of spacers which are arranged adjacently to the energy storage devices in the first direction. Each of the spacers includes a passage defining portion which defines, with the energy storage device arranged adjacently to the spacer in the first direction, passages. The energy storage devices arranged at both ends in the first direction are cooled more easily than the energy storage devices arranged between the energy storage devices arranged at both ends in the first direction.

19 Claims, 12 Drawing Sheets

(56) References Cited

U.S. PATENT DOCUMENTS

| | | | | |
|---|---|---|---|---|
| 2011/0111282 | A1 | 5/2011 | Nagamine et al. | |
| 2012/0052359 | A1 | 3/2012 | Yoshitake et al. | |
| 2013/0078488 | A1 | 3/2013 | Nemoto et al. | |
| 2013/0157103 | A1 | 6/2013 | Osakabe et al. | |
| 2013/0202926 | A1 | 8/2013 | Yoon | |
| 2014/0295227 | A1* | 10/2014 | Aoki | H01M 2/1016 429/82 |
| 2015/0207120 | A1* | 7/2015 | Mochizuki | H01M 2/1016 429/156 |
| 2016/0028131 | A1* | 1/2016 | Lee | H01M 10/6557 429/120 |
| 2016/0036029 | A1* | 2/2016 | Tononishi | H01M 2/1077 429/121 |
| 2016/0036103 | A1* | 2/2016 | Yamamoto | H01M 2/1077 429/120 |
| 2016/0036105 | A1* | 2/2016 | Toshioka | H01M 2/1077 429/120 |

FOREIGN PATENT DOCUMENTS

| | | | |
|---|---|---|---|
| JP | 2006-128122 | A | 5/2006 |
| JP | 2008-282648 | A | 11/2008 |
| JP | 2009-081056 | A | 4/2009 |
| JP | 2009-211907 | A | 9/2009 |
| JP | 2009-277575 | A | 11/2009 |
| JP | 2010-010460 | A | 1/2010 |
| JP | 2010-092610 | A | 4/2010 |
| JP | 2010-146777 | A | 7/2010 |
| JP | 4501080 | B2 | 7/2010 |
| JP | WO 2010-131700 | A1 | 11/2010 |
| JP | 2010-272251 | A | 12/2010 |
| JP | 2010-272378 | A | 12/2010 |
| JP | 2011-023180 | A | 2/2011 |
| JP | 2011-103271 | A | 5/2011 |
| JP | 2011-238468 | A | 11/2011 |
| JP | 2012-054053 | A | 3/2012 |
| JP | 2012-064357 | A | 3/2012 |
| JP | 2012-160260 | A | 8/2012 |
| JP | 2012-216424 | A | 11/2012 |
| JP | 2012-248374 | A | 12/2012 |
| JP | 2013-004523 | A | 1/2013 |
| JP | 2013-084580 | A | 5/2013 |
| JP | WO 2013/073046 | A1 | 5/2013 |
| JP | 2013-118153 | A | 6/2013 |
| JP | 2013-145686 | A | 7/2013 |
| JP | 2013-161792 | A | 8/2013 |
| JP | 2013-187010 | A | 9/2013 |
| JP | 2014-036001 | A | 2/2014 |
| JP | 2014-082170 | A | 5/2014 |
| JP | 2014-179178 | A | 9/2014 |
| WO | WO 2014/061814 | A1 | 4/2014 |

* cited by examiner 40, 4
24B
220A, 22A
221A, 22A
Z
X
Y
1
2A, 2
40, 4
311, 31
310, 31
30
3
310, 31
311, 31

SATURATION TEMPERATURE [°C]

$E_1$ $E_2$ $E_3$ $E_4$ $E_5$ $E_6$ $E_7$ $E_8$ $E_9$ $E_{10}$ $E_{11}$ $E_{12}$ $E_{13}$ $E_{14}$ $E_{15}$ $E_{16}$ $E_{17}$ $E_{18}$

ENERGY STORAGE APPARATUS

CROSS-REFERENCE TO RELATED APPLICATIONS

This application claims the benefit of Japanese patent applications No. 2014-155013 and No. 2014-155016, filed on Jul. 30, 2014, which are incorporated by reference.

FIELD

The present invention relates to an energy storage apparatus which includes energy storage devices.

BACKGROUND

An electric vehicle requires a power source having a large capacity and hence, a battery module which includes a plurality of battery cells is used.

A battery module of this type includes: a plurality of battery cells arranged in a row in one direction; a plurality of spacers each of which is arranged between every two battery cells arranged adjacently to each other in the one direction; and a pair of spacers for end portions which is arranged on outer sides of the plurality of battery cells in the one direction (see JP-A-2014-36001, for example).

The battery module is also configured such that the respective battery cells are cooled by allowing a cooling medium to flow through gaps formed between the respective battery cells. In the battery module of this type, each spacer has cutaway portions formed over the whole length in the width direction of the battery cell. Accordingly, in the battery module of this type, each battery cell is supposed to be cooled by allowing a cooling medium to pass through the inside of the cutaway portion of each spacer.

In such a battery module, the cutaway portions of the respective spacers are formed uniformly. Accordingly, in the battery module, there may be a case where the temperature of a cooling medium which passes through the inside of the cutaway portions of the spacers becomes irregular among the respective spacers. In such a case, in the respective battery cells, a heat exchange is performed with cooling mediums having different temperatures. Accordingly, in the battery module, there may be a case where the temperatures of the respective battery cells become irregular.

For example, the battery module may be used in such a manner that a cooling medium is supplied to the battery module from a supply device arranged around one end portion of the battery module in one direction, and the cooling medium is discharged from a discharge device arranged around the other end portion of the battery module in the one direction.

In the case where the temperature of the supply device or the temperature of the discharge device is increased, heat generated by the supply device is transferred to a cooling medium which flows around the one end portion of the battery module, and heat generated by the discharge device is transferred to a cooling medium around the other end portion of the battery module. Accordingly, the temperature of a cooling medium which passes through the inside of the respective cutaway portions of the pair of spaces for end portions of the battery module becomes higher than the temperature of a cooling medium which passes through the inside of the cutaway portions of the plurality of spacers each of which is arranged between every two battery cells arranged adjacently to each other in the one direction.

That is, the temperature of the cooling medium which cools the respective battery cells arranged at both ends of the battery module in the first direction among the plurality of battery cells becomes higher than the temperature of the cooling medium which cools the respective battery cells arranged between both ends of the battery module in the first direction among the plurality of battery cells.

Accordingly, in the battery module, among the plurality of battery cells, there may be a case where the temperatures of the respective battery cells arranged at both ends of the battery module in one direction become higher than the temperature of other battery cells so that the temperatures of the respective energy storage devices become irregular.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus where the increase of temperatures of battery cells arranged at both ends in one direction can be suppressed.

An energy storage apparatus according to an aspect of the present invention includes: a plurality of energy storage devices arranged in a first direction, the energy storage devices include two end energy storage devices; an inner spacer arranged between the energy storage devices; and an outer spacer arranged at an end of the energy storage devices, wherein the inner spacer defines an inner passage with the energy storage device adjacently arranged in the first direction, wherein the outer spacer defines an outer passage with the end energy storage device, and wherein a relation $qo/qi>1$ is satisfied, where qo is a mean value of heat transfer amounts transferred from the end electric storage devices to a fluid passing the inner and outer passages of the two end electric storage devices, qi is a mean value of heat transfer amounts transferred from the electric storage devices arranged between the two end electric storage devices to a fluid passing the inner passages.

BRIEF DESCRIPTION OF DRAWINGS

The foregoing and other features of the present invention will become apparent from the following description and drawings of an illustrative embodiment of the invention in which:

Figure 9:
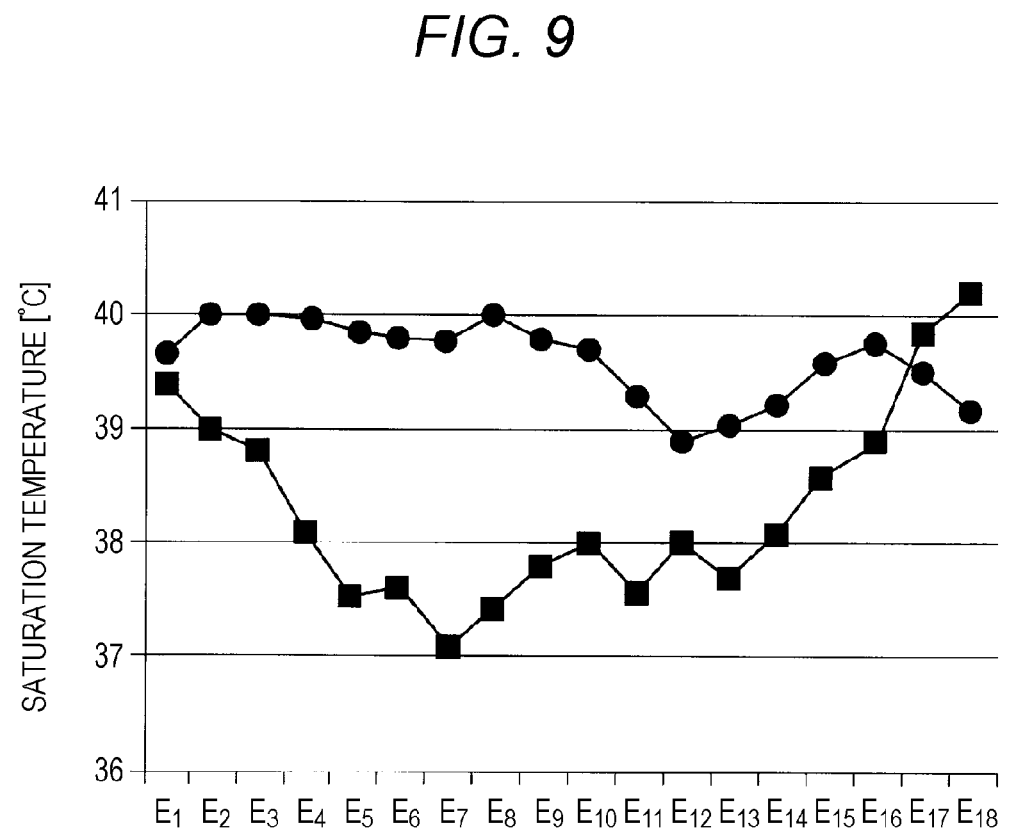

FIG. 9 is a graph showing the measurement results of temperatures of respective energy storage devices of Examples 1, 2 of the present invention.

DESCRIPTION OF EMBODIMENTS

Figure 1:
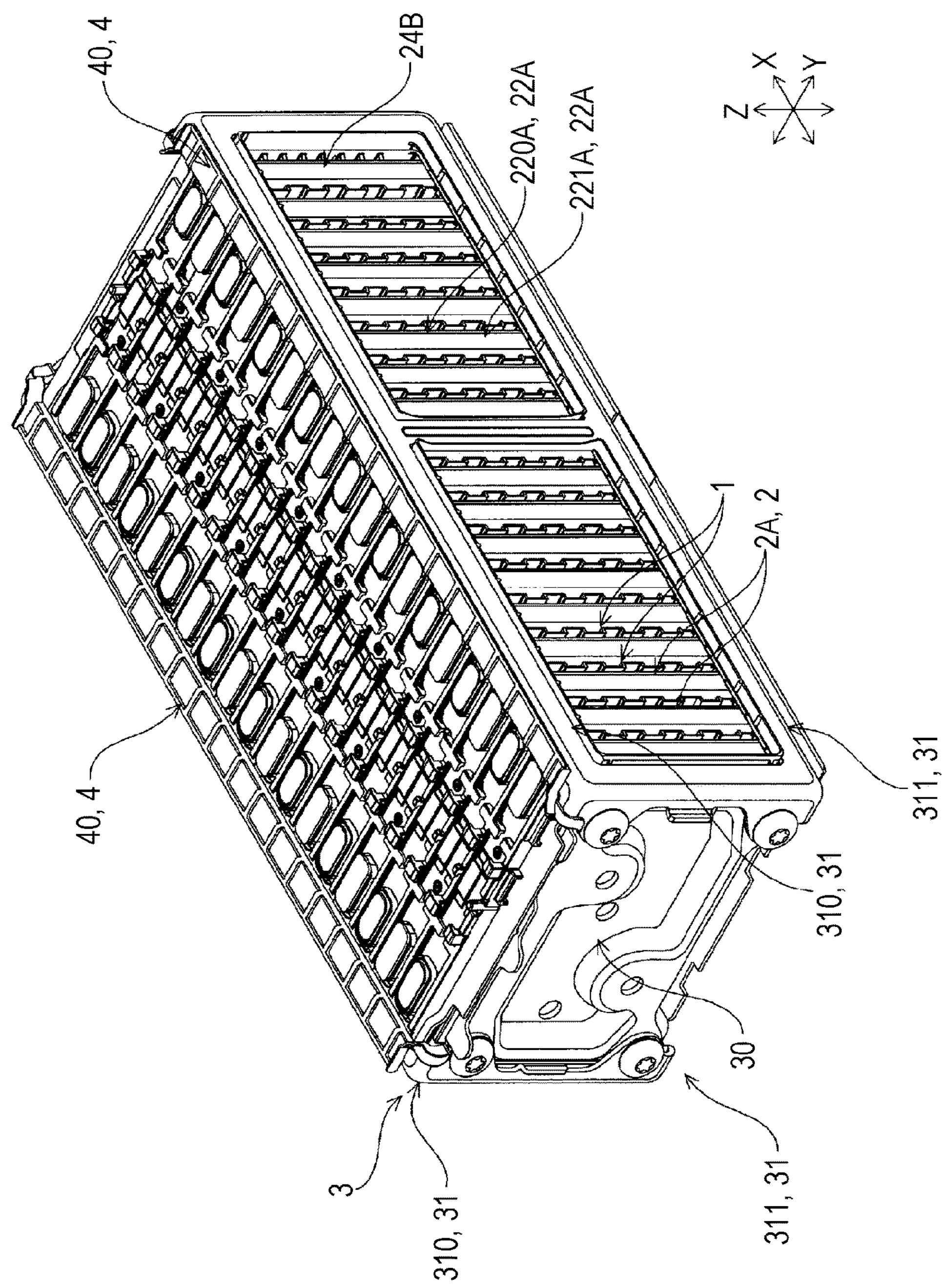
FIG. 1 is a perspective view of an energy storage apparatus according to one embodiment of the present invention.

According to an aspect of the present invention, there is provided an energy storage apparatus including: a plurality of energy storage devices arranged in a first direction, the energy storage devices include two end energy storage devices; an inner spacer arranged between the energy storage devices; and an outer spacer arranged at an end of the energy storage devices, wherein the inner spacer defines an inner passage with the energy storage device adjacently arranged in the first direction, wherein the outer spacer defines an outer passage with the end energy storage device, and wherein a relation $qo/qi>1$ is satisfied, where qo is a mean value of heat transfer amounts transferred from the end electric storage devices to a fluid passing the inner and outer passages of the two end electric storage devices, qi is a mean value of heat transfer amounts transferred from the electric storage devices arranged between the two end electric storage devices to a fluid passing the inner passages.

With this configuration, among the plurality of energy storage devices, the end energy storage devices arranged at both ends in the first direction exhibit higher heat exchange efficiency than the energy storage devices arranged between the end energy storage devices. Accordingly, in the energy storage apparatus, among the plurality of energy storage devices, the end energy storage devices arranged at both ends in the first direction can radiate heat more easily than the energy storage devices arranged between the end energy storage devices.

Accordingly, in the energy storage apparatus, it is possible to suppress that the temperature of the end energy storage devices arranged at both ends in the first direction becomes higher than the temperature of the energy storage devices arranged between the end energy storage devices.

The outer passage may be set larger than the inner passage in cross-sectional area in a direction orthogonal to a direction along which the fluid flows.

With this configuration, a larger amount of fluid is allowed to flow through the outer passage than through the inner passage. Accordingly, among the plurality of energy storage devices, the end energy storage devices arranged at both ends in the first direction can be cooled by a larger amount of fluid than the energy storage devices arranged between the end energy storage devices.

Accordingly, in the energy storage apparatus, it is possible to suppress that the temperature of the respective end energy storage devices arranged at both ends in the first direction becomes higher than the temperature of the respective energy storage devices arranged between the end energy storage devices.

With this configuration, a cooling area for the energy storage device in the outer passage may be set larger than a cooling area for the energy storage device in the inner passage.

With this configuration, a larger amount of fluid is brought into contact with the energy storage devices in the outer passage than in the inner passage. Accordingly, in the energy storage apparatus, it is possible to suppress that the temperature of the respective end energy storage devices arranged at both ends in the first direction becomes higher than the temperature of the respective energy storage devices arranged between the end energy storage devices.

The outer spacer may include a pair of outer spacers arranged to sandwich both ends of the energy storage devices in the first direction, the inner spacer may include a plurality of inner spacers each of which is arranged between every energy storage devices arranged adjacently to each other in the first direction, each of the inner passages defined by the plurality of inner spacers may have the same or substantially the same cross-sectional area in the direction orthogonal to the direction along which the fluid flows, and each of the outer passages defined by the pair of outer spacers may be larger than the inner passage in cross-sectional area in the direction orthogonal to the direction along which the fluid flows.

Also with this configuration, it is possible to make the end energy storage devices arranged at both ends in the first direction exhibit higher heat exchange efficiency than the energy storage devices arranged between the end energy storage devices. Accordingly, in the energy storage apparatus, it is possible to suppress that the temperature of the end energy storage devices arranged at both ends in the first direction becomes higher than the temperature of the energy storage devices arranged between the end energy storage devices. Further, in the energy storage apparatus, it is possible to change a heat transfer amount by only changing a cross-sectional area of the outer passage of the outer spacer.

The outer spacer may include: an opposedly-facing portion which is arranged in a spaced-apart manner from the energy storage device arranged adjacently to the outer spacer in the first direction; and a plurality of contact portions extending toward the energy storage device from the opposedly-facing portion, the inner spacer may include: a plurality of abutting portions which are formed along the energy storage device arranged adjacently to the inner spacer in the first direction, and are in contact with the energy storage device; and a plurality of joint portions connecting the plurality of abutting portions, and the plurality of contact portions of the outer spacer and the plurality of joint portions of the inner spacer may be arranged at positions where the contact portions and the joint portions overlap with each other as viewed in the first direction.

With this configuration, the plurality of contact portions of the outer spacer and the plurality of joint portions of the inner spacer are brought into a state where the contact portions and the joint portions are arranged side by side in the first direction, that is, intervals at which the plurality of contact portions of the outer spacer are arranged and intervals at which the plurality of joint portions of the inner spacer are arranged can be made equal to each other or can be made substantially equal to each other.

Accordingly, each outer spacer and each inner spacer can efficiently transmit a load to the constitutions arranged adjacently to each outer spacer and each inner spacer in the X axis direction.

According to another aspect of the present invention, there is provided an energy storage apparatus including: a plurality of energy storage devices arranged in a first direction, the energy storage devices include two end energy storage devices; an inner spacer arranged between the energy storage devices; and an outer spacer arranged at an end of the energy storage devices; wherein the inner spacer defines an inner passage with the energy storage device adjacently arranged in the first direction, wherein the outer spacer defines an outer passage with the end energy storage device, and wherein a relation $A_o \times \sqrt{a_o} > A_i \times \sqrt{a_i}$ is satisfied, where $A_o$ is a mean value of cooling areas for the end energy storage devices arranged at both ends in the first direction, $A_i$ is a mean value of cooling areas for the energy storage devices arranged between the end energy storage devices, $a_o$ is a mean value of cross-sectional areas of the outer passages and inner passages arranged adjacently to the end energy storage devices, and $a_i$ is a mean value of cross-sectional areas of the inner passages arranged adjacently to the energy storage devices arranged between the end energy storage devices.

With this configuration, a larger amount of fluid is allowed to flow through the outer passage than through the inner passage. Accordingly, among the plurality of energy storage devices, the end energy storage devices arranged at both ends in the first direction exhibit higher heat exchange efficiency than the energy storage devices arranged between the end energy storage devices. Accordingly, in the energy storage apparatus, among the plurality of energy storage devices, the end energy storage devices arranged at both ends in the first direction can radiate heat more easily than the energy storage devices arranged between the end energy storage devices.

Accordingly, in the energy storage apparatus, it is possible to suppress that the temperature of the end energy storage devices arranged at both ends in the first direction becomes higher than the temperature of the energy storage devices arranged between the end energy storage devices.

As has been described above, according to the aspects of the present invention, it is possible to provide an energy storage apparatus where the increase of temperatures of battery cells arranged at both ends in one direction can be suppressed.

Hereinafter, one embodiment of an energy storage apparatus of the present invention is described by reference to drawings. Names of respective components of this embodiment are used only for this embodiment, and may differ from names of respective components in BACKGROUND.

As shown in FIG. 1, an energy storage apparatus includes: energy storage devices 1; spacers 2 which are arranged adjacently to the energy storage devices 1; and a holder 3 which collectively holds the energy storage devices 1 and the spacers 2. The holder 3 is formed by using an electrically conductive material. The energy storage apparatus also includes insulators 4 which are arranged between the energy storage devices 1 and the holder 3.

Figure 2:
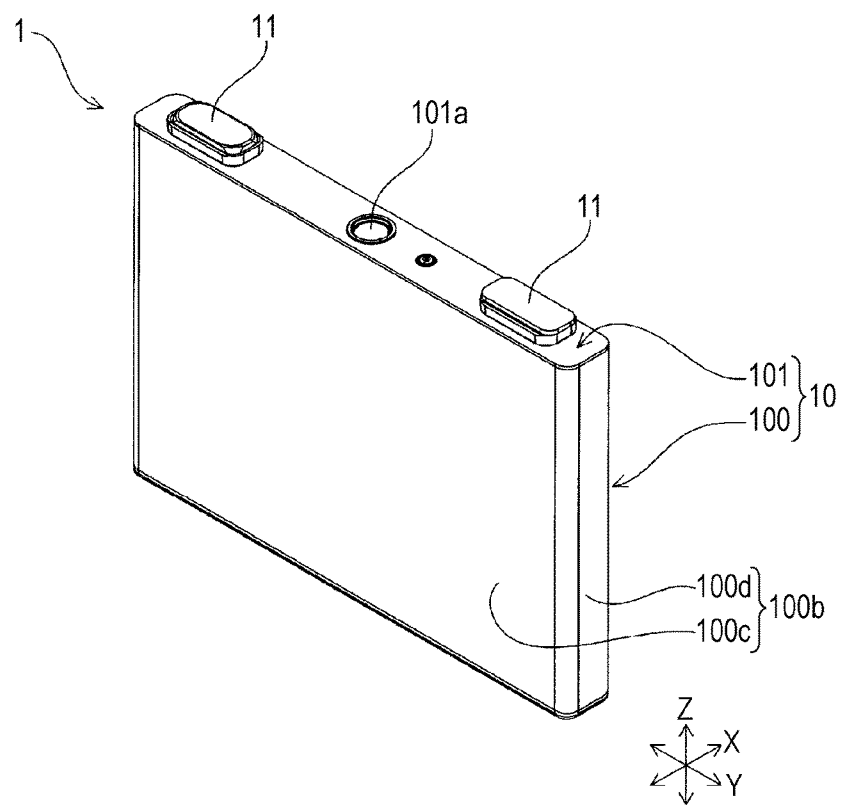
FIG. 2 is a perspective view of an energy storage device in the energy storage apparatus according to the embodiment.
Figure 3:
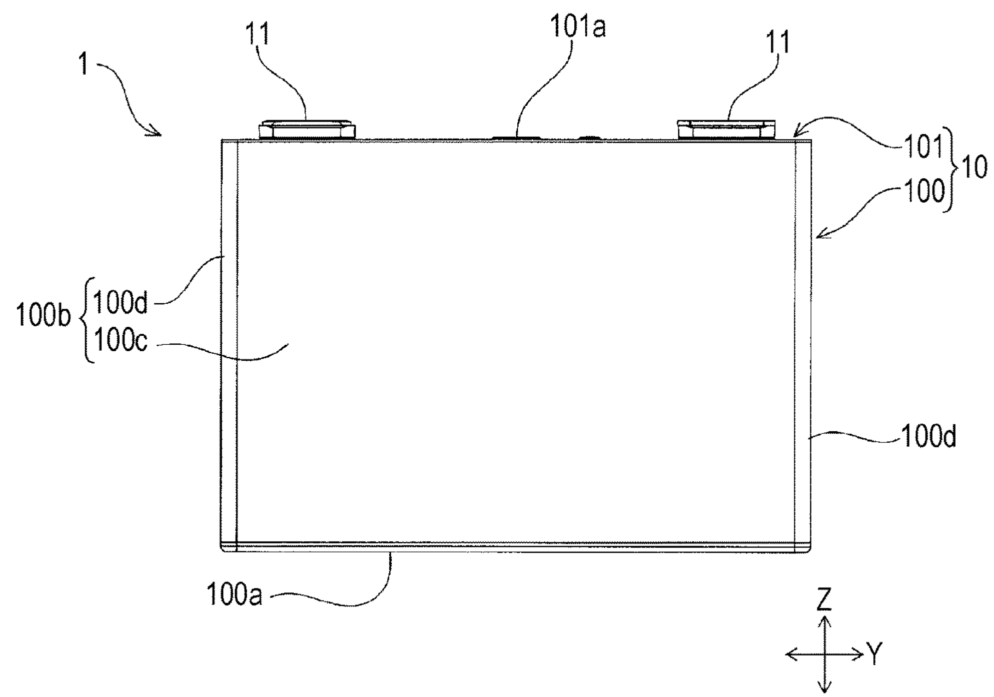
FIG. 3 is a front view of the energy storage device in the energy storage apparatus according to the embodiment.

As shown in FIG. 2 and FIG. 3, the energy storage device 1 includes: an electrode assembly which includes a positive electrode and a negative electrode; a case 10 which houses the electrode assembly; and a pair of external terminals 11 arranged on an outer surface of the case 10.

The case 10 includes: a case body 100 having an opening; and a lid plate 101 which closes the opening of the case body 100, and the pair of external terminals 11 is arranged on an outer surface of lid plate 101.

The case body 100 includes: a closing portion **100*a* (see FIG. 3); and a cylindrical barrel portion 100*b* which is connected to a periphery of the closing portion 100*a* so as to surround the closing portion 100*a***.

The barrel portion **100*b* includes: a pair of first walls 100*c* which faces each other with a distance therebetween; and a pair of second walls 100*d* which faces each other with the pair of first walls 100*c*** interposed therebetween.

The first wall **100*c* and the second wall 100*d* are each formed into a rectangular shape. That is, respective surfaces of the first wall 100*c* and the second wall 100*d* are flat surfaces and each form a rectangular region. The first wall 100*c* and the second wall 100*d* are arranged adjacently to each other in a state where respective edges of the first and second walls 100*c*, 100*d* abut each other. In view of such a configuration, the edge of the first wall 100*c* and the edge of the second wall 100*d* which are arranged adjacently to each other are connected to each other over the entire length. Accordingly, the barrel portion 100*b* is formed into an angular cylindrical shape. One end of the barrel portion 100*b* is closed by the closing portion 100*a*. On the other hand, the other end of the barrel portion 100*b* is opened, and is closed by the lid plate 101**.

In this embodiment, a surface area of the first wall **100*c* is set larger than a surface area of the second wall 100*d*. In view of such a configuration, the barrel portion 100*b*** is formed into a flat angular cylindrical shape.

The energy storage apparatus according to this embodiment includes a plurality of energy storage devices 1 which form an energy storage device group. The plurality of energy storage devices 1 are arranged in a row in one direction. In this embodiment, the plurality of the energy storage devices 1 are arranged in a row in a state where the first walls **100*c* of the cases 10 are directed in one direction. The energy storage apparatus includes a bus bar which electrically connects the external terminals 11 of every two energy storage devices 1** which are arranged adjacently to each other.

In the description made hereinafter, for the sake of convenience, the direction (first direction) along which the energy storage devices 1 are arranged in a row is referred to as an X axis direction. Further, out of two axial directions which are orthogonal to the direction (X axis direction) along which the energy storage devices 1 are arranged in a row, one direction (second direction) is referred to as a Y axis direction, and the remaining one direction (third direction) is referred to as a Z axis direction. In accordance with such a coordinate system, in the drawings, respective three orthogonal axes (coordinate axes) which correspond to the X axis direction, the Y axis direction and the Z axis direction are described complementarily.

The spacers 2 have insulating property. The spacer 2 includes: a base which is arranged adjacently to the case 10 (the first wall **100*c* of the barrel portion 100*b*) of the energy storage device 1; and restricting portions which prevent the positional displacement of the energy storage devices 1 arranged adjacently to the base. The spacer 2 also includes a passage defining portion which defines, with the energy storage device 1 arranged adjacently to the spacer 2** in the X axis direction, a passage.

Figure 4:
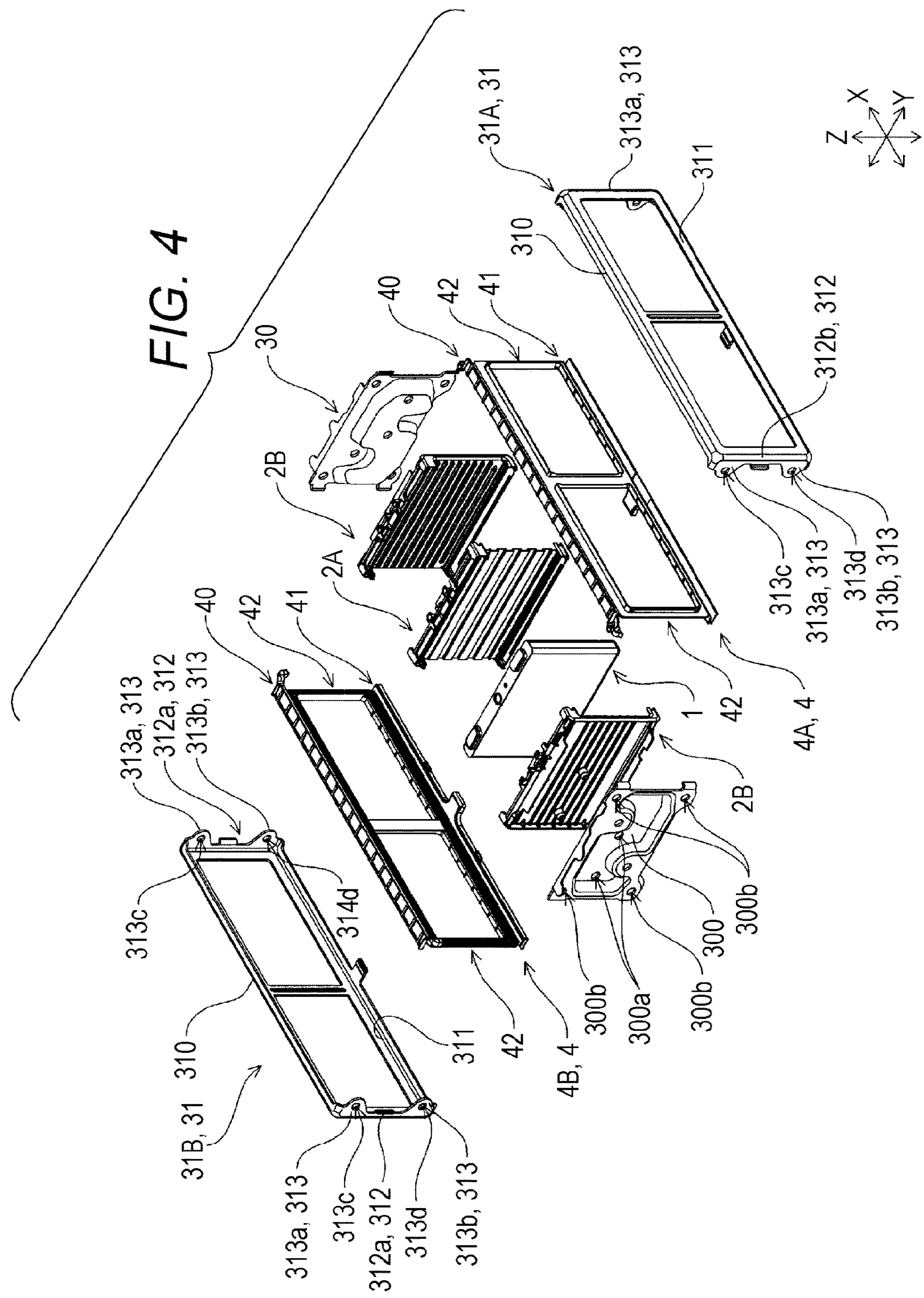
FIG. 4 is a perspective view of the energy storage apparatus according to the embodiment.

The spacers 2 are described more specifically. As described above, the energy storage apparatus includes the plurality of energy storage devices 1. Accordingly, the energy storage apparatus includes the plurality of spacers 2 which are arranged adjacently to the plurality of respective energy storage devices 1 in the X axis direction. In view of such a configuration, as shown in FIG. 4, the energy storage apparatus includes two kinds of spacers 2 (2A, 2B). That is, the energy storage apparatus includes, as the spacers 2, the spacer 2A which is arranged between every two energy storage devices 1 arranged adjacently to each other (hereinafter referred to as "inner spacer"); and the spacers 2B which are arranged so as to sandwich both ends of the plurality of energy storage devices 1 in the X axis direction (hereinafter referred to as "outer spacers").

Figure 5:
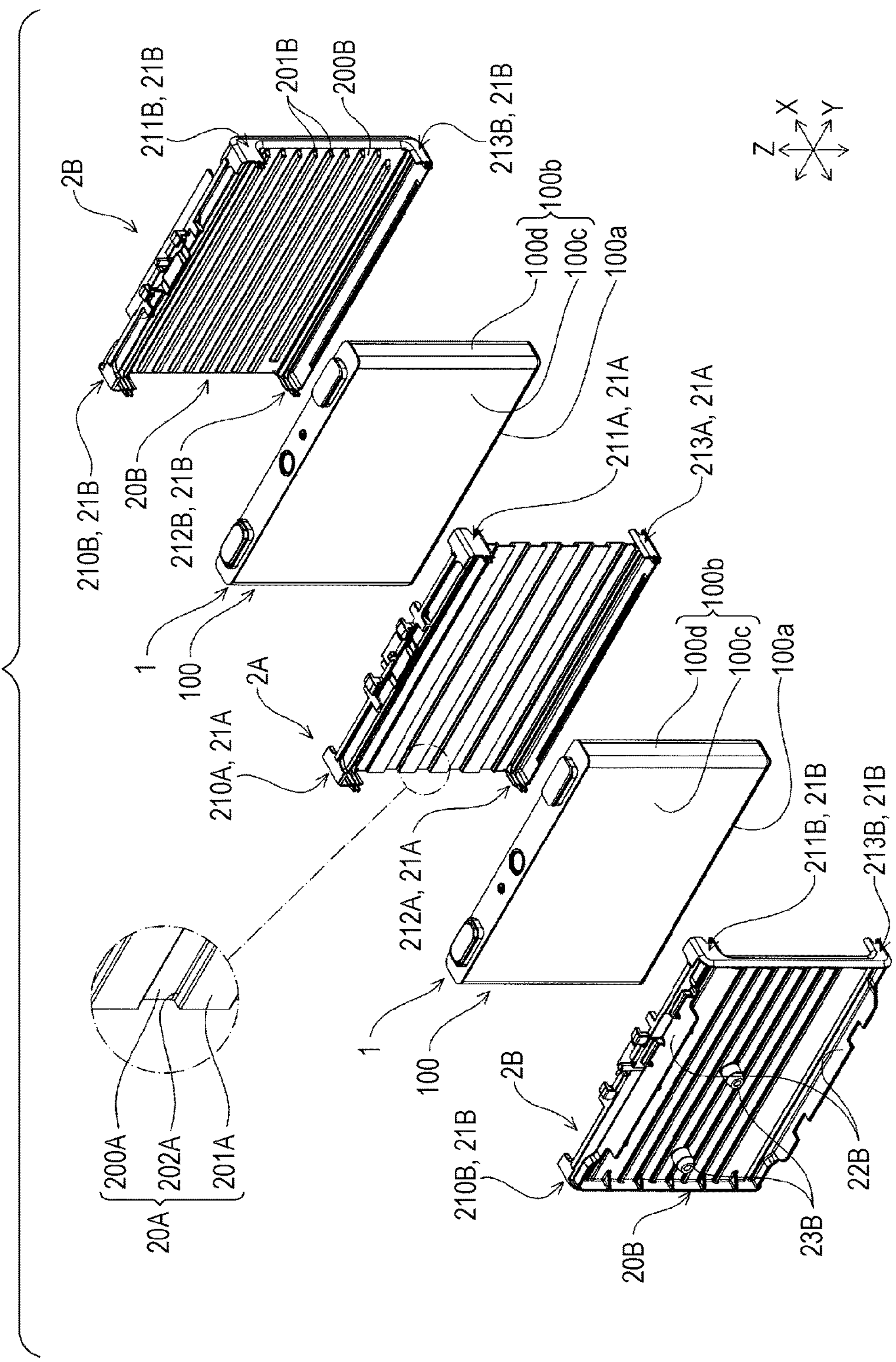
FIG. 5 is a perspective view of inner spacers, outer spacers and the energy storage devices in the energy storage apparatus according to the embodiment.

Firstly, the inner spacer 2A is described. As shown in FIG. 5, the inner spacer 2A includes: a base 20A arranged adjacently to the energy storage device 1 (the first wall 100*c* of the case body 100); and restricting portions 21A which prevent the positional displacement of two energy storage devices 1 arranged adjacently to the base 20A.

The base 20A of the inner spacer 2A is sandwiched between two energy storage devices 1. Accordingly, the base 20A of the inner spacer 2A has: a first surface which faces one energy storage device 1 in an opposed manner out of two energy storage devices 1 arranged adjacently to the inner spacer 2A; and a second surface which is disposed on a side opposite to the first surface and faces the other energy storage device 1 in an opposed manner out of the two energy storage devices 1.

The base 20A of the inner spacer 2A has: a first end arranged at a position corresponding to the lid plate 101 of the energy storage device 1: and a second end disposed on a side opposite to the first end and arranged at a position corresponding to the closing portion 100*a* of the energy storage device 1. The base 20A of the inner spacer 2A also has: a third end arranged at a position corresponding to one second wall 100*d* of the energy storage device 1; and a fourth end disposed on a side opposite to the third end and arranged at a position corresponding to the other second wall 100*d* of the energy storage device 1.

The base 20A of the inner spacer 2A has: a first corner portion where the first end and the third end of the base 20A are connected to each other; and a second corner portion where the first end and the fourth end of the base 20A are connected to each other. The base 20A of the inner spacer 2A also has: a third corner portion where the second end and the third end of the base 20A are connected to each other; and a fourth corner portion where the second end and the fourth end of the base 20A are connected to each other.

The first end and the second end of the base 20A of the inner spacer 2A extend in the Y axis direction. The third end and the fourth end of the base 20A of the inner spacer 2A extend in the Z axis direction. Accordingly, the base 20A of the inner spacer 2A is formed into an approximately rectangular shape. The base 20A of the inner spacer 2A is formed so as to have a size substantially equal to the size of the first wall 100*c* of the energy storage device 1.

Figure 6:
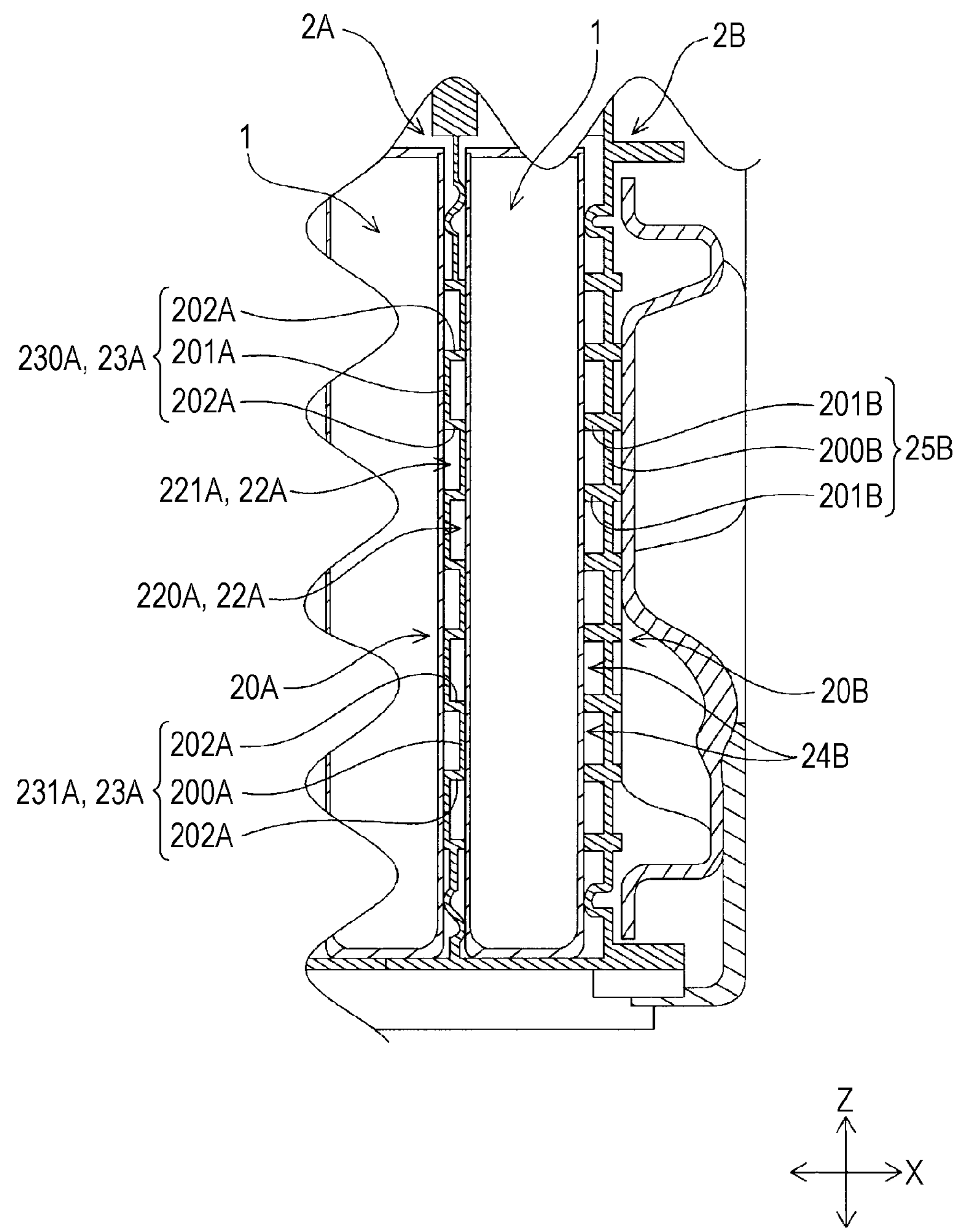
FIG. 6 is a cross-sectional view of the energy storage apparatus according to the embodiment.

As shown in FIG. 6, each of the plurality of inner spacers 2A defines, with the energy storage device 1 arranged adjacently to the inner spacer 2A in the X axis direction, passages (hereinafter referred to as "inner passages") 22A. Accordingly, each of the plurality of inner spacers 2A includes: passage defining portions 23A (hereinafter referred to as "first passage defining portions 230A") which define, with one energy storage device 1 out of two energy storage devices 1 arranged adjacently to the inner spacer 2A in the X axis direction, inner passages 22A (220A); and inner passage defining portions 23A (hereinafter referred to as "second passage defining portions 231A") which define, with the other energy storage device 1 out of the two energy storage devices 1 arranged adjacently to the inner spacer 2A in the X axis direction, inner passages 22A (221A).

A more specific description follows. In the energy storage device 1 according to this embodiment, the base 20A of the inner spacer 2A is formed into a rectangular corrugated shape.

As described above, the inner spacer 2A is arranged between every two energy storage devices 1 arranged adjacently to each other. Accordingly, the inner spacer 2A includes abutting portions 200A, 201A which are in contact with the energy storage devices 1 arranged adjacently to the inner spacer 2A in the X axis direction and are formed along the energy storage devices 1.

In this embodiment, the base 20A of the inner spacer 2A includes: the abutting portions (hereinafter referred to as first abutting portions) 200A which are in contact with one energy storage device 1 out of two energy storage devices 1 arranged adjacently to each other in the X axis direction; and the abutting portions (hereinafter referred to as second abutting portions) 201A which are in contact with the other energy storage device 1 out of the two energy storage devices 1 arranged adjacently to each other in the X axis direction. In view of such a configuration, the base 20A of the inner spacer 2A includes joint portions 202A each of which is positioned between the first abutting portion 200A and the second abutting portion 201A.

The first abutting portion 200A has a long side thereof in the Y axis direction. The second abutting portion 201A has a long side thereof in the Y axis direction.

The joint portion 202A is connected to the first abutting portion 200A and the second abutting portion 201A. The joint portion 202A extends along the X axis direction and the Y axis direction between the energy storage devices 1 arranged adjacently to each other (see FIG. 5).

In this embodiment, the base 20A of the inner spacer 2A includes: the plurality of first abutting portions 200A; and the plurality of second abutting portions 201A. The first abutting portions 200A and the second abutting portions 201A are alternately arranged in the direction along which the first end and the second end of the base 20A of the inner spacer 2A are arranged. In such a configuration, the base 20A of the inner spacer 2A includes the plurality of joint portions 202A.

Accordingly, in the inner spacer 2A, each inner passage 22A (220A) is defined on the first surface of the base 20A by the two joint portions 202A arranged adjacently to each other in the Z axis direction and the second abutting portion 201A (to be more specific, a surface of the second abutting portion 201A on a side opposite to a surface of the second abutting portion 201A which is in contact with the energy storage device 1) connected to the two joint portions 202A.

That is, the first passage defining portion 230A is configured such that the two joint portions 202A arranged adjacently to each other in the Z axis direction and the second abutting portion 201A connected to the two joint portions 202A define, with the energy storage device 1 arranged adjacently to one side of the inner spacer 2A in the X axis direction, one inner passage 22A (220A).

Further, in the inner spacer 2A, each inner passage 22A (221A) is defined on the second surface of the base 20A of the inner spacer 2A by the two joint portions 202A arranged adjacently to each other in the Z axis direction and the first abutting portion 200A (to be more specific, a surface of the first abutting portion 200A on a side opposite to a surface of the first abutting portion 200A which is in contact with the energy storage device 1) connected to the two joint portions 202A.

That is, the second passage defining portion 231A is configured such that the two joint portions 202A arranged adjacently to each other in the Z axis direction and the first abutting portion 200A connected to the two joint portions 202A define, with the energy storage device 1 arranged adjacently to the other side of the inner spacer 2A in the X axis direction, one inner passage 22A (221A).

With this configuration, in the energy storage apparatus of this embodiment, the plurality of first passage defining portions 230A are arranged in a spaced-apart manner in the Z axis direction. That is, the plurality of first passage defining portions 230A and the plurality of second passage defining portions 231A are arranged such that the first passage defining portion 230A and the second passage defining portion 231A are alternately arranged in the Z axis direction.

The inner passages 220A defined on the first surface of the base 20A of the inner spacer 2A and the inner passages 221A defined on the second surface of the base 20A of the inner spacer 2A are defined such that the inner passage 220A and the inner passage 221A have the same or substantially the same cross-sectional area.

In this manner, in the inner spacer 2A, the inner passages 22A are defined between the first surface of the base 20A and the energy storage device 1 as well as between the second surface of the base 20A of the inner spacer 2A and the energy storage device 1.

As described above, the inner spacer 2A is arranged between every two energy storage devices 1 arranged adjacently to each other. Accordingly, as shown in FIG. 5, to restrict the relative movement between every two energy storage devices 1 arranged adjacently to the inner spacer 2A, the restricting portions 21A extend toward the energy storage device 1 arranged adjacently to the first surface of the base 20A of the inner spacer 2A and toward the energy storage device 1 arranged adjacently to the second surface of the base 20A of the inner spacer 2A.

A more specific description follows. The restricting portion 21A is formed on respective corner portions of the base 20A of the inner spacer 2A. The inner spacer 2A includes, as the restricting portions 21A: a first restricting portion 210A formed on the first corner portion; a second restricting portion 211A formed on the second corner portion; a third restricting portion 212A formed on the third corner portion; and a fourth restricting portion 213A formed on the fourth corner portion.

The first restricting portion 210A and the second restricting portion 211A extend toward the energy storage device 1 arranged adjacently to the first surface of the base 20A of the inner spacer 2A and toward the energy storage device 1 arranged adjacently to the second surface of the base 20A of the inner spacer 2A.

The first restricting portion 210A is in contact with the lid plate 101 and one second wall 100*d* of the barrel portion 100*b* of each of the energy storage devices 1 arranged on both sides of the base 20A of the inner spacer 2A. The second restricting portion 211A is in contact with the lid plate 101 and the other second wall 100*d* of the barrel portion 100*b* of each of the energy storage devices 1 arranged on both sides of the base 20A of the inner spacer 2A.

The third restricting portion 212A and the fourth restricting portion 213A extend toward the energy storage device 1 arranged adjacently to the first surface of the base 20A of the inner spacer 2A and toward the energy storage device 1 arranged adjacently to the second surface of the base 20A of the inner spacer 2A.

The third restricting portion 212A is in contact with the closing portion 100*a* and one second wall 100*d* of the barrel portion 100*b* of each of the energy storage devices 1 arranged on both sides of the base 20A of the inner spacer 2A. The fourth restricting portion 213A arranged on the other side is in contact with the closing portion 100*a* and the other second wall 100*d* of the barrel portion 100*b* of each of the energy storage devices 1 arranged on both sides of the base 20A of the inner spacer 2A.

Next, the outer spacer 2B is described. The outer spacer 2B includes: a base 20B having a first surface which faces the energy storage device 1 (the first wall 100*c* of the case body 100) and a second surface which is disposed on a side opposite to the first surface (hereinafter referred to as "base 20B"); and restricting portions 21B which determine the position of the energy storage device 1 arranged adjacently to the base 20B (hereinafter referred to as "restricting portions 21B").

In this embodiment, the outer spacer 2B is configured such that the base 20B and an end plate 30 of the holder 3 described later face each other in an opposed manner. That is, the outer spacer 2B is arranged between the energy storage device 1 and the end plate 30.

The base 20B of the outer spacer 2B extends in the Y axis direction and the Z axis direction which are orthogonal to the X axis direction. That is, the base 20B is formed in a plate shape. The base 20B of the outer spacer 2B has: a first end arranged at the position corresponding to the lid plate 101 of the energy storage device 1; and a second end disposed on a side opposite to the first end and arranged at the position corresponding to the closing portion 100*a* of the energy storage device 1. The base 20B of the outer spacer 2B also has a third end arranged at the position corresponding to one second wall 100*d* of the energy storage device 1; and a fourth end disposed on a side opposite to the third end and arranged at the position corresponding to the other second wall 100*d* of the energy storage device 1.

The base 20B of the outer spacer 2B has: a first corner portion where the first end and the third end are connected to each other; and a second corner portion where the first end and the fourth end are connected to each other. The base 20B of the outer spacer 2B also has: a third corner portion where the second end and the third end are connected to each other; and a fourth corner portion where the second end and the fourth end are connected to each other.

The first end and the second end of the base 20B of the outer spacer 2B extend in the Y axis direction. The third end and the fourth end of the base 20B of the outer spacer 2B extend in the Z axis direction. Accordingly, the base 20B of the outer spacer 2B has an approximately rectangular shape. The base 20B of the outer spacer 2B has a size substantially equal to the size of the first wall 100*c* of the energy storage device 1.

In this embodiment, the base 20B of the outer spacer 2B includes: an opposedly-facing portion 200B which is arranged in a spaced-apart manner from the energy storage device 1 in the X axis direction; and a plurality of contact portions 201B which extend from the opposedly-facing portion 200B and are in contact with the energy storage device 1 arranged adjacently to the base 20B in the X axis direction (hereinafter referred to as inner contact portions 201B).

As described above, the base 20B of the outer spacer 2B is formed into an approximately rectangular shape, and has a size approximately equal to the size of the first wall 100*c* of the energy storage device 1. Accordingly, the opposedly-facing portion 200B is also formed into an approximately rectangular shape, and has a size approximately equal to the size of the first wall 100*c* of the energy storage device 1.

The plurality of inner contact portions 201B extend straightly in the Y axis direction. As shown in FIG. 6, the plurality of inner contact portions 201B are arranged at intervals in the Z axis direction.

In this embodiment, the plurality of inner contact portions 201B are arranged at a position where the inner contact portions 201B overlap with the joint portions 202A of the inner spacer 2A as viewed in the X axis direction. That is, the plurality of inner contact portions 201B are arranged side by side with the respective joint portions 202A of the inner spacer 2A in the X axis direction.

As shown in FIG. 6, the outer spacer 2B defines, with the energy storage device 1 arranged adjacently to the outer spacer 2B in the X axis direction, passages (hereinafter referred to as "outer passages") 24B. Accordingly, in this embodiment, the outer spacer 2B includes passage defining portions 25B which define, with the energy storage device 1 arranged adjacently to the outer spacer 2B in the X axis direction, the outer passages 24B.

As described above, in the outer spacer 2B, the plurality of inner contact portions 201B are in contact with the energy storage device 1 arranged adjacently to the outer spacer 2B in the X axis direction. Accordingly, in the outer spacer 2B, each of the outer passages 24B is defined between the outer spacer 2B and the energy storage device 1 arranged adjacently to the outer spacer 2B in the X axis direction by two inner contact portions 201B arranged adjacently to each other in the Z axis direction and the opposedly-facing portion 200B connected to the two inner contact portions 201B.

That is, the passage defining portion 25B is configured such that two inner contact portions 201B arranged adjacently to each other in the Z axis direction and the opposedly-facing portion 200B connected to the two inner contact portions 201B define, with the energy storage device 1 arranged adjacently to the outer spacer 2B in the X axis direction, one outer passage 24B.

Here, the relation among the energy storage devices 1, the inner passages 22A and the outer passages 24B is described. The energy storage apparatus is configured such that a relation of $q_o/q_i>1$ is satisfied, where $q_o$ represents a mean value of heat transfer amounts of the pair of energy storage devices 1 arranged at both ends in the X axis direction among the plurality of energy storage devices 1 which are amounts of heat transferred to a fluid which flows through the inner passages 22A (220A) and the outer passages 24B from the pair of energy storage devices 1, and qi represents a mean value of heat transfer amounts of the plurality of energy storage devices 1 arranged between the energy storage devices 1 arranged at both ends which are amounts of heat transferred to a fluid which flows through the inner passages 22A (220A, 221A) from the plurality of energy storage devices 1 arranged between the energy storage devices 1 arranged at both ends.

In each outer spacer 2B, a cross-sectional area of the outer passages 24B (a sum of cross-sectional areas of the outer passages 24B in the direction orthogonal to the direction along which a fluid flows) is set larger than a cross-sectional area of the inner passages 220A of the inner spacer 2A (a sum of cross-sectional areas of the inner passages 220A in the direction orthogonal to the direction along which a fluid flows). A cross-sectional area of the outer passages 24B is set larger than a cross-sectional area of the inner passages 221A of the inner spacer 2A (a sum of cross-sectional areas of the inner passages 221A in the direction orthogonal to the direction along which a fluid flows).

A cooling area for the energy storage device 1 in the outer passages 24B of each outer spacer 2B (a sum of areas of portions of the energy storage device 1 exposed to the outer passages 24B) is set larger than a cooling area for the energy storage device 1 in the inner passages 230A (23A) of each inner spacer 2A (a sum of areas of portions of the energy storage device 1 exposed to the inner passages 220A).

A cooling area for the energy storage device 1 in the outer passages 24B of each outer spacer 2B (a sum of areas of portions of the energy storage device 1 exposed to the outer passages 24B) is set larger than a cooling area for the energy storage device 1 in the inner passages 231A (23A) of each inner spacer 2A (a sum of areas of portions of the energy storage device 1 exposed to the inner passages 221A).

As described above, the first surface of the outer spacer 2B is arranged adjacently to the energy storage device 1. To restrict the relative movement of the energy storage device 1 arranged adjacently to the first surface of the outer spacer 2B, the restricting portions 21B extend toward the energy storage device 1 arranged adjacently to the first surface of the base 20B of the outer spacer 2B.

A more specific description follows. The outer spacer 2B includes, as the restricting portions 21B: restricting portions 21B formed at the first end of the base 20B; and restricting portions 21B formed at the second end of the base 20B.

The outer spacer 2B includes, as the restricting portions 21B: a first restricting portion 210B formed on the first corner portion; a second restricting portion 211B formed on the second corner portion; a third restricting portion 212B formed on the third corner portion; and a fourth restricting portion 213B formed on the fourth corner portion.

As described above, the first surface of the base 20B of the outer spacer 2B faces the energy storage device 1 in an opposed manner. Accordingly, the first restricting portion 210B and the second restricting portion 211B extend toward the energy storage device 1 arranged adjacently to the first surface of the base 20B of the outer spacer 2B.

The first restricting portion 210B is in contact with a first end of the lid plate 101 and the second wall 100*d* of the barrel portion 100*b* of the energy storage device 1 arranged adjacently to the first surface of the base 20B of the outer spacer 2B. The second restricting portion 211B is in contact with a second end of the lid plate 101 and the second wall 100*d* of the barrel portion 100*b* of the energy storage device 1 arranged adjacently to the first surface of the base 20B of the outer spacer 2B.

As described above, the first surface of the base 20B of the outer spacer 2B faces the energy storage device 1 in an opposed manner. Accordingly, the third restricting portion 212B and the fourth restricting portion 213B extend toward the energy storage device 1 arranged adjacently to the first surface of the base 20B of the outer spacer 2B.

The third restricting portion 212B is in contact with a first end of the closing portion 100*a* and the second wall 100*d* of the barrel portion 100*b* of the energy storage device 1 arranged adjacently to the first surface of the base 20B of the outer spacer 2B. The fourth restricting portion 213B is in contact with the second end of the closing portion 100*a* and the second wall 100*d* of the barrel portion 100*b* of the energy storage device 1 arranged adjacently to the first surface of the base 20B of the outer spacer 2B.

In this embodiment, as described above, the outer spacer 2B is arranged adjacently to the inner spacer 2A with the energy storage device 1 interposed therebetween. That is, the energy storage apparatus includes a pair of outer spacers 2B.

The outer spacers 2B are arranged at respective ends of an energy storage device group consisting of the plurality of energy storage devices 1 in the X axis direction. That is, in the energy storage apparatus, a pair of outer spacers 2B is arranged so as to sandwich the plurality of energy storage devices 1 therebetween in the X axis direction.

As described above, in the pair of respective outer spacers 2B, the first surface faces the case body 100 of the energy storage device 1 in an opposed manner. Therefore, the pair of outer spacers 2B is arranged such that the first surfaces of the bases 20B of the outer spacers 2B face each other. Accordingly, in the energy storage apparatus, the pair of outer spacers 2B is arranged symmetrically in the X axis direction.

As described above, the holder 3 collectively holds the energy storage devices 1 and the spacers 2.

In this embodiment, the holder 3 is made of metal. The holder 3 includes: a pair of end plates 30 which directly or indirectly sandwiches both ends of the energy storage device group consisting of the plurality of energy storage devices 1 in the X axis direction; and frames 31 which connect the pair of end plates 30 to each other.

As described above, the energy storage apparatus includes the outer spacers 2B arranged adjacently to the energy storage devices 1 arranged at both sides in the X axis direction among the plurality of energy storage devices 1. Accordingly, the pair of end plates 30 is arranged at the positions arranged adjacently to the respective outer spacers 2B as shown in FIG. 4.

Returning to FIG. 5, each of the pair of end plates 30 has: a first surface which faces the outer spacer 2B in an opposed manner; and a second surface which is disposed on a side opposite to the first surface. Each of the pair of end plates 30 has a pressure contact portion 300 which is in contact with the outer spacer 2B.

The end plate 30 has: a first end arranged at the position corresponding to the lid plate 101 of the energy storage device 1; and a second end disposed on a side opposite to the first end (the second end arranged at the position corresponding to the closing portion 100*a* of the energy storage device 1). The end plate 30 also has: a third end arranged at the position corresponding to one second wall 100*d* of the energy storage device 1; and a fourth end disposed on a side opposite to the third end (the fourth end arranged at the position corresponding to the other second wall 100*d* of the energy storage device 1).

With such a configuration, the end plate 30 has a first corner portion where the first end and the third end are connected to each other; and a second corner portion where the first end and the fourth end are connected to each other. The end plate 30 also has: a third corner portion where the second end and the third end are connected to each other; and a fourth corner portion where the second end and the fourth end are connected to each other.

The pressure contact portion 300 has insertion holes 300*a* formed at positions corresponding to shaft portions 23B of the outer spacer 2B. The pressure contact portion 300 also has a plurality of (four in this embodiment) through holes 300*b* which are formed in the corner portions.

The frame 31 has a first connecting portion 310 which extends between the pair of end plates 30 and is arranged at the position corresponding to the lid plates 101 of the energy storage devices 1; and a second connecting portion 311 which extends between the pair of end plates 30 and is arranged at the position corresponding to the closing portions 100*a* of the energy storage devices 1.

The frame 31 also has a pair of bridge portions 312 connected with the first connecting portion 310 and the second connecting portion 311.

In this embodiment, the bridge portions 312 are connected with the first connecting portion 310 and the second connecting portion 311 so that the frame 31 is formed into a frame shape. In view of such a configuration, with respect to the energy storage apparatus according to this embodiment, in the description made hereinafter, a part which includes the first connecting portion 310, the second connecting portion 311 and the bridge portions 312 arranged on one side of the energy storage devices in the Y axis direction may be referred to as a first connecting member 31A, and a part which includes the first connecting portion 310, the second connecting portion 311 and the bridge portions 312 arranged on the other side of the energy storage device 1 in the Y axis direction may be referred to as a second connecting member 31B.

The frame 31 has fixing portions 313 which are connected to the end plates 30.

The first connecting portion 310 has a first end and a second end disposed on a side opposite to the first end in the direction which forms a long side.

The first connecting portion 310 is bent in the direction orthogonal to the direction which forms the long side. When a bent portion of the first connecting portion 310 is set as a boundary, one portion of the first connecting portion 310 is arranged at the position corresponding to the lid plate 101 of the energy storage device 1. When the bent portion of the first connecting portion 310 is set as the boundary, the other portion of the first connecting portion 310 is arranged at the position corresponding to the second wall 100*d* of the energy storage device 1.

The second connecting portion 311 has a first end and a second end on a side opposite to the first end in the direction which forms a long side.

The second connecting portion 311 is bent in the direction orthogonal to the direction which forms the long side. When a bent portion of the second connecting portion 311 is set as a boundary, one portion of the second connecting portion 311 is arranged at the position corresponding to the lid plate 101 of the energy storage device 1. When the bent portion is set as the boundary of the second connecting portion 311, the other portion of the second connecting portion 311 is arranged at the position corresponding to the second wall 100*d* of the energy storage device 1.

The bridge portions 312 include: a first bridge portion 312*a* connected to the first end of the first connecting portion 310 and the first end of the second connecting portion 311; and a second bridge portion 312*b* connected to the second end of the first connecting portion 310 and the second end of the second connecting portion 311.

The fixing portions 313 include: a pair of first fixing portions 313*a* which is formed at the first end and the second end of the first connecting portions 310; and a pair of second fixing portions 313*b* which is formed at the first end and the second end of the second connecting portions 311.

One first fixing portion 313*a* faces a portion around the through hole 300*b* formed in one end plate 30 in an opposed manner. The other first fixing portion 313*a* faces a portion around the through hole 300*b* formed in the other end plate 30 in an opposed manner. A first hole 313*c* is formed in the pair of first fixing portions 313*a* at positions corresponding to the through holes 300*b*.

Accordingly, the first connecting portion 310 is connected to the end plates 30 by threadedly mounting nuts on bolts which pass through the through holes 300*b* formed in the end plates 30 and the first holes 313*c* formed in the first fixing portions 313*a*.

One second fixing portion 313*b* faces a portion around the through hole 300*b* formed in one end plate 30 in an opposed manner. The other second fixing portion 313*b* faces a portion around the through hole 300*b* formed in the other end plate 30 in an opposed manner. A second hole 313*d* is formed in the pair of second fixing portions 313*d* at positions corresponding to the through holes 300*b*.

Accordingly, the second connecting portion 311 is connected to the end plates 30 by threadedly mounting nuts on bolts which pass through the through holes 300*b* formed in the end plates 30 and the second holes 313*d* formed in the second fixing portions 313*b*.

The insulator 4 is made of a material having an insulation property. The insulator 4 has: a first insulating portion 40 arranged between the first connecting portion 310 and the spacers 2 (the inner spacers 2A and the outer spacers 2B); and a second insulating portion 41 arranged between the second connecting portion 311 and the spacers 2 (the inner spacers 2A and the outer spacers 2B).

The insulator 4 has third insulating portions 42 connected with the first insulating portion 40 and the second insulating portion 41.

The first insulating portion 40 has a long side thereof extending in the X axis direction. The first insulating portion 40 is arranged between the energy storage devices 1 and the first connecting portion 310 of the frame 3. That is, the first insulating portion 40 is bent in the direction orthogonal to the long side direction. One portion of the first insulating portion 40 with a bent portion of the first insulating portion 40 set as a boundary is in contact with one portion of the first connecting portion 310 with the bent portion of the first connecting portion 310 set as the boundary. Further, the other portion of the first insulating portion 40 with the bent portion of the first insulating portion 40 set as the boundary is in contact with the other portion of the first connecting portion 310 with the bent portion of the first connecting portion 310 set as the boundary.

The second insulating portion 41 has a long side in the X axis direction. The second insulating portion 41 is arranged between the energy storage devices 1 and the second connecting portion 311 of the frame 3. That is, the second insulating portion 41 is bent in the direction orthogonal to the direction which forms the long side. One portion of the second insulating portion 41 with a bent portion of the second insulating portion 41 set as a boundary is in contact with one portion of the second connecting portion 311 with the bent portion of the second connecting portion 311 set as the boundary. The other portion of the second insulating portion 41 with the bent portion of the second insulating portion 41 set as the boundary is in contact with the other portion of the second connecting portion 311 with the bent portion of the second connecting portion 311 set as the boundary.

In this embodiment, the insulator 4 has two third insulating portions 42. A more specific description follows. In the insulator 4, a first end of the first insulating portion 40 and a first end of the second insulating portion 41 are connected to each other by the third insulating portion 42, and a second end of the first insulating portion 40 and a second end of the second insulating portion 41 are connected to each other by the third insulating portion 42.

As has been described above, the energy storage apparatus according to this embodiment is configured such that a relation of $q_o/q_i>1$ is satisfied, where $q_o$ represents a mean value of heat transfer amounts of the pair of energy storage devices 1 arranged at both ends in the X axis direction among the plurality of energy storage devices 1, and $q_i$ represents a mean value of heat transfer amounts of the plurality of energy storage devices 1 arranged between the energy storage devices 1 arranged at both ends. Therefore, the energy storage devices 1 arranged at both ends in the X axis direction exhibit higher heat exchange efficiency than the plurality of energy storage devices 1 arranged between the energy storage devices 1 arranged at both ends. Accordingly, in the energy storage apparatus, among the plurality of energy storage devices 1, the energy storage devices 1 arranged at both ends in the X axis direction can radiate heat more easily than the energy storage devices 1 arranged between the energy storage devices 1 arranged at both ends.

Accordingly, in the energy storage apparatus according to this embodiment, it is possible to suppress that the temperature of the respective energy storage devices 1 arranged at both ends in the X axis direction becomes higher than the temperature of the respective energy storage devices 1 arranged between the energy storage devices arranged at both ends in the X axis direction. As a result, the energy storage apparatus can suppress the irregularities in temperature among the energy storage devices 1.

Further, a cross-sectional area of the outer passage 24B in a direction orthogonal to a direction along which a fluid flows is set larger than a cross-sectional area of the inner passage 220A in a direction orthogonal to the direction that the fluid flows. The cross-sectional area of the outer passage 24B in the direction orthogonal to the direction along which the fluid flows is set larger than a cross-sectional area of the inner passage 221A in the direction orthogonal to the direction that the fluid flows.

Accordingly, a larger amount of fluid is allowed to flow through the outer passage 24B than through the inner passage 22A. With this configuration, in the energy storage apparatus, among the plurality of energy storage devices 1, the energy storage devices 1 arranged at both ends in the X axis direction can be cooled by a larger amount of fluid than the energy storage devices 1 arranged between the energy storage devices 1 arranged at both ends.

Further, in this embodiment, the inner passages 220A, 221A formed by each inner spacer 2A have the same cross-sectional area, and the cross-sectional area of the outer passage 24B formed by the outer spacer 2B is set larger than the cross-sectional areas of the inner passages 220A, 221A. Further, in the energy storage apparatus, it is possible to change a heat transfer amount only by changing the cross-sectional area of the outer passage 24B of the outer spacer 2B.

With this configuration, in the energy storage apparatus, it is possible to suppress that the occurrence of irregularities in temperature between each of the energy storage devices 1 arranged at both ends in the X axis direction and each of the energy storage devices 1 arranged between the energy storage devices 1 arranged at both ends in the X axis direction and, at the same time, it is possible to suppress that the occurrence of irregularities in temperature between the energy storage devices 1 arranged between the energy storage devices 1 arranged at both ends in the X axis direction. Accordingly, it is possible to surely suppress the occurrence of irregularities in temperature between the plurality of energy storage devices 1.

A cooling area for the energy storage device 1 in the outer passage 24B is set larger than a cooling area for the energy storage device 1 in the inner passage 220A. The cooling area for the energy storage device 1 in the outer passage 24B is also set larger than a cooling area for the energy storage device 1 in the inner passage 221A. With this configuration, in the energy storage apparatus, a larger amount of fluid is brought into contact with the energy storage devices 1 in the outer passage 24B than in the inner passage 220A and the inner passage 221A.

Further, the plurality of inner contact portions 201B of the outer spacer 2B and the plurality of joint portions 202A of the inner spacer 2A are arranged at positions where the inner contact portions 201B and the joint portions 202A overlap with each other as viewed in the X axis direction.

With this configuration, the plurality of inner contact portions 201B of the outer spacer 2B and the plurality of joint portions 201A of the inner spacer 2A are arranged side by side in the X axis direction. That is, intervals at which the plurality of inner contact portions 201B of the outer spacer 2B are arranged in a row and intervals at which the plurality of joint portions 201A of the inner spacer 2A are arranged in a row can be made to agree with each other or can be made to substantially agree with each other.

Accordingly, outer spacers 2B and inner spacers 2A can efficiently transmit a load to the constitutions arranged adjacently to outer spacers 2B and inner spacers 2A in the X axis direction.

It is needless to say that the energy storage apparatus according to the present invention is not limited to the above-mentioned embodiment, and various modifications are conceivable without departing from the gist of the present invention.

In the above-mentioned embodiment, the base 20A of the inner spacer 2A has an approximately rectangular shape, and has a size substantially equal to the size of the first wall 100*c* of the energy storage device 1. However, provided that the base 20A of the inner spacer 2A can make postures of two energy storage devices 1 arranged adjacently to the inner spacer 2A correspond to each other, the shape of the base 20A of the inner spacer 2A is not limited to the approximately rectangular shape, and the size of the base 20A of the inner spacer 2A is also not limited to the size substantially equal to the size of the first wall 100*c* of the energy storage device 1.

In the above-mentioned embodiment, the passages 22A are formed between the base 20A and the energy storage device 1 by forming the base 20A of the inner spacer 2A into a rectangular corrugated shape. However, provided that a fluid is allowed to pass through between the first surface and the energy storage device 1 (between the second surface and the energy storage device 1), the shape of the base 20A of the inner spacer 2A is not limited to the rectangular corrugated shape. Further, when it is unnecessary to form the passages 24B between the base 20A of the inner spacer 2A and the energy storage device 1, the base 20A of the inner spacer 2A may be formed into a flat plate shape.

In the above-mentioned embodiment, the restricting portions 21A of the inner spacer 2A are formed at the respective corner portions of the base 20A. However, provided that the restricting portions 21A of the inner spacers 2A can determine the position of the energy storage device 1 with respect to the base 20A, the positions where the restricting portions 21A of the inner spacer 2A are formed on the base 20A are not limited.

In the above-mentioned embodiment, the base 20B of the outer spacer 2B has an approximately rectangular shape, and has a size substantially equal to the size of the first wall 100*c* of the energy storage device 1. However, provided that the base 20B can make the postures of the energy storage device 1 and the end plate 30 arranged adjacently to each other correspond to each other, the shape of the base 20B is not limited to the approximately rectangular shape, and the size of the base 20B is also not limited to the size substantially equal to the size of the first wall 100*c* of the energy storage device 1.

In the above-mentioned embodiment, the restricting portions 21B of the outer spacer 2B are formed at the respective corner portions of the base 20B. However, provided that the restricting portions 21B of the outer spacer 2B can determine the position of the energy storage device 1 with respect to the base 20B, the positions where the restricting portions 21B of the outer spacer 2B are formed on the base 20B are not limited.

Although not mentioned particularly in the above-mentioned embodiment, the outer spacer 2B and the inner spacer 2A may be formed of different materials so that the energy storage apparatus has the configuration where, among the plurality of energy storage devices 1, an amount of heat transferred to a fluid from each of the pair of energy storage devices 1 arranged at both ends in the X axis direction is set larger than an amount of heat transferred to a fluid from each of energy storage devices 1 arranged between the pair of energy storage devices 1.

The energy storage apparatus of the above-mentioned embodiment is configured to satisfy the relation of $q_o/q_i>1$. However, the configuration of the energy storage apparatus is not limited to the above. For example, the energy storage apparatus may be configured such that a relation $A_o \times \sqrt{a_o} > A_i \times \sqrt{a_i}$ is satisfied, where $A_o$ is a mean value of cooling areas for the pair of energy storage devices 1 arranged at both ends in the X axis direction among the plurality of energy storage devices 1, $A_i$ is a mean value of cooling areas for the plurality of energy storage devices 1 arranged between the pair of energy storage devices 1, $a_o$ is a mean value of cross-sectional areas of the outer passages 24B and the inner passages 22A arranged adjacently to the pair of energy storage devices 1, and $a_i$ is a mean value of cross-sectional areas of the inner passages 22A arranged adjacently to the plurality of energy storage devices 1 arranged between the energy storage devices 1 arranged at both ends in the X axis direction.

Although not particularly mentioned in the above-mentioned embodiment, in the inner spacer 2A, the depth of the inner passages 220A, 221A in the X axis direction is changed when the length of the joint portion 202A in the X axis direction is changed, and the width of the inner passage 220A and the width of the inner passage 221A in the Z axis direction are changed when the length of the first abutting portion 200A and the length of the second abutting portion 201A in the Z axis direction are changed.

That is, in the inner spacer 2A, by changing the length of the joint portion 202A in the X axis direction, or by changing the lengths of the first abutting portion 200A and the second abutting portion 201A in the Z axis direction, the cross-sectional areas of the inner passages 220A, 221A, or the cooling area for the energy storage device 1 can be changed.

Also in the outer spacer 2A, the depth of the outer passage 24B in the X axis direction is changed when the length of the inner contact portion 201B in the X axis direction is changed, and the width of the outer passage 24B in the Z axis direction is changed when the thickness of the inner contact portion 201B in the Z axis direction (that is, a contact area of the inner contact portion 201B with respect to the energy storage device 1) is changed.

That is, in the outer spacer 2A, by changing the length of the inner contact portion 201B in the X axis direction, or by changing the thickness of the inner contact portion 201B in the Z axis direction (that is, the contact area of the inner contact portion 201B with respect to the energy storage device 1), the cross-sectional area of the outer passage 24B, or the cooling area for the energy storage device 1 can be changed.

EXAMPLES

Example 1

Subsequently, the relation between a heat transfer amount q of the energy storage device 1 and an electric current value Y (A) of the respective energy storage devices 1 is described with reference to the Examples. The present invention is not limited by the Examples.

The heat transfer amounts q of the respective energy storage devices 1 are calculated as follows. A more specific description follows. A mean value $q_o$ of heat transfer amounts of a pair of energy storage devices 1 arranged at both ends in the X axis direction is calculated by the following formula 1. Further, a mean value $q_i$ of heat transfer amounts of a plurality of energy storage devices 1 arranged between the pair of energy storage devices 1 arranged at both ends in the X axis direction is calculated by the following formula 2.

$$q_o = C_o \times A_o \times \sqrt{a_o} \quad \text{[Formula 1]}$$

$$q_i = C_i \times A_i \times \sqrt{a_i} \quad \text{[Formula 2]}$$

In the formula, $A_o$ means a mean value of cooling areas ($mm^2$) of the pair of energy storage devices 1 arranged at both ends in the X axis direction. The description is made specifically. The mean value $A_o$ of the cooling areas ($mm^2$) of the pair of energy storage devices 1 arranged at both ends in the X axis direction means a mean value of a sum of areas where one energy storage device 1 out of the pair of energy storage devices 1 arranged at both ends is in contact with the outer passages 24B and the inner passages 220A (22A) and a sum of areas where the other energy storage device 1 out of the pair of energy storage devices 1 arranged at both ends is in contact with the outer passages 24B and the inner passages 221A (22A).

The area where each of the pair of energy storage devices 1 arranged at both ends in the X axis direction is in contact with the outer passages 24B and the inner passages 22A means a sum of areas of portions of the energy storage device 1 which are exposed to the outer passages 24B and the inner passages 22A.

Figure 7:
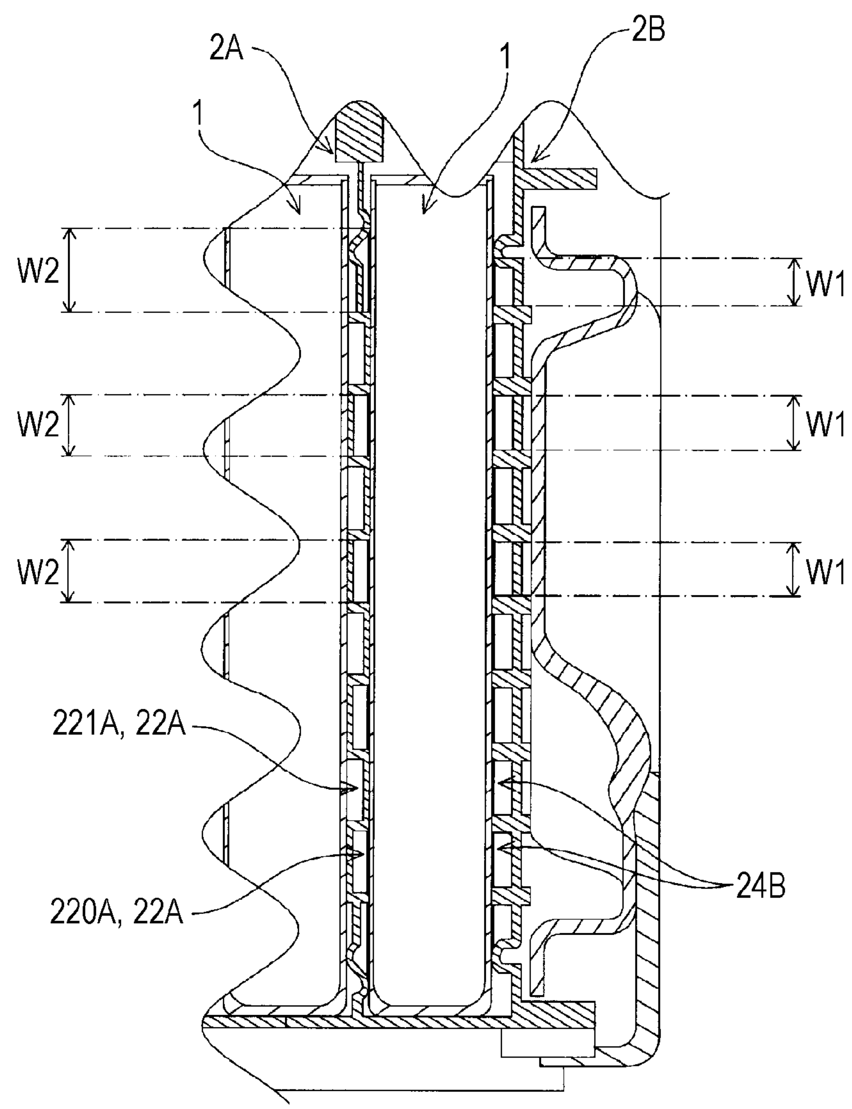
FIG. 7 is an explanatory view of a cooling area for the energy storage device according to Examples 1, 2 of the present invention.
Figure 7:
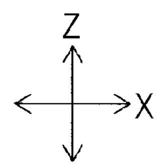

Accordingly, as shown in FIG. 7, the sum of the areas where the energy storage device 1 is in contact with the outer passages 24B can be calculated by multiplying a sum of widths W1 of the outer passages 24B in the Z axis direction by the length of the energy storage device 1 in the Y axis direction. The sum of the areas where the energy storage device 1 is in contact with the inner passages 22A (inner passages 220A or inner passages 221A) can be calculated by multiplying a sum of widths of the inner passages 22A (the inner passages 220A or the inner passages 221A) in the Z axis direction by the length of the energy storage device 1 in the Y axis direction.

$a_o$ means a mean value of cross-sectional areas ($mm^2$) of passages (the outer passages 24B and the inner passages 22A (the inner passages 220A or the inner passages 221A)) arranged adjacently to the pair of energy storage devices 1 arranged at both ends in the X axis direction. That is, the mean value $a_o$ of the cross-sectional areas ($mm^2$) of the passages means a mean value between a sum of cross-sectional areas of the outer passages 24B and the inner passages 22A (the inner passages 220A or the inner passages 221A) arranged adjacently to one energy storage device 1 out of the pair of energy storage devices 1 arranged at both ends and a sum of cross-sectional areas of the outer passages 24B and the inner passages 22A (the inner passages 220A or the inner passages 221A) arranged adjacently to the other energy storage device 1 out of the pair of energy storage devices 1 arranged at both ends.

Figure 8:
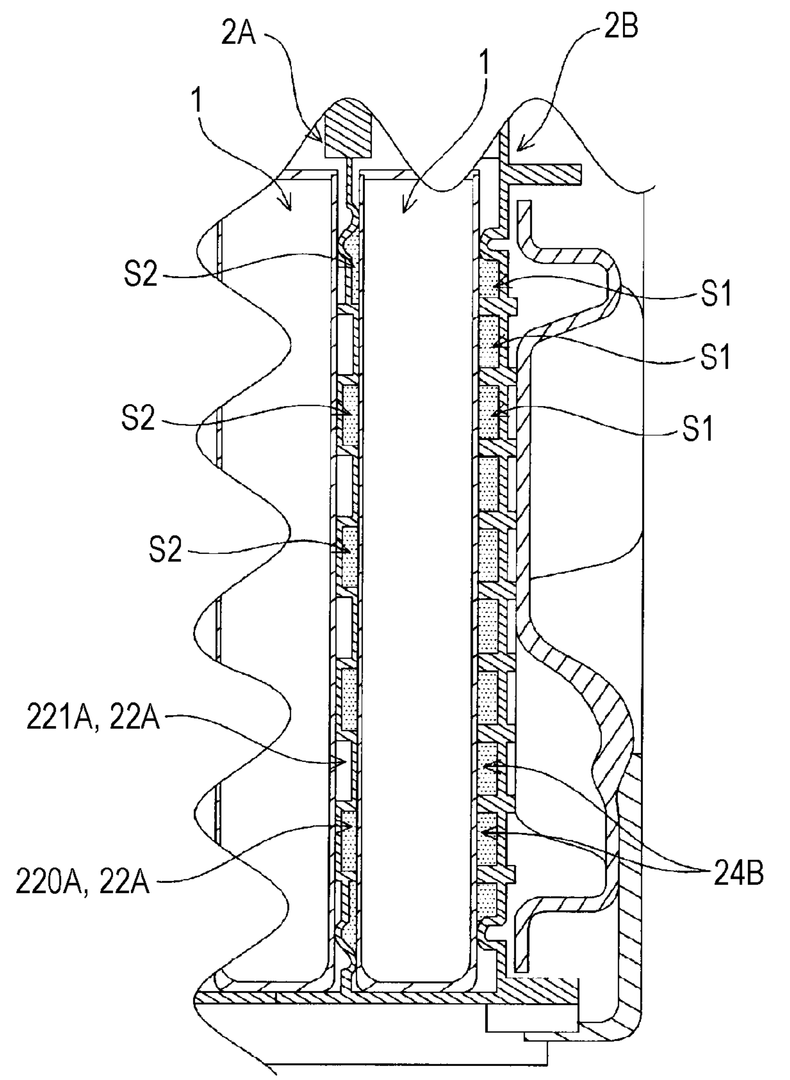
FIG. 8 is an explanatory view of a cross-sectional area of a passage according to Examples 1, 2 of the present invention.

As shown in FIG. 8, the cross-sectional areas of the passages arranged adjacently to the pair of energy storage devices 1 arranged at both ends mean cross-sectional areas of the passages in the direction orthogonal to the direction along which a fluid flows.

$C_o$ is a constant which is determined based on the kind of cooling medium, the temperature and the flow speed of the cooling medium, the temperature of the energy storage device 1, the thermal conductivity of the case 10 of the energy storage device 1, the thermal conductivity of the spacer 2 and the like.

$A_i$ represents a mean value of cooling areas ($mm^2$) for the energy storage devices 1 arranged between the energy storage devices 1 arranged at both ends in the X axis direction. To be more specific, $A_i$ represents a mean value of sums of areas where each of the energy storage devices 1 arranged between the energy storage devices 1 arranged at both ends is in contact with a pair of inner passages arranged adjacently to the energy storage device 1 in the X axis direction.

As described above, the cooling areas for the energy storage devices 1 arranged between the energy storage devices 1 arranged at both ends in the X axis direction means a sum of areas of portions of the energy storage devices 1 which are exposed to the inner passages 220A, 221A (see FIG. 8). Accordingly, a sum of areas where the energy storage device 1 is in contact with the inner passages 220A, 221A is calculated by multiplying a sum of widths of the inner passages 220A, 221A in the Z axis direction by the length of the energy storage device 1 in the Y axis direction.

$a_i$ represents a mean value of cross-sectional areas ($mm^2$) of the inner passages 220A, 221A arranged adjacently to the respective energy storage devices 1 arranged between the energy storage devices 1 arranged at both ends in the X axis direction. To be more specific, $a_i$ represents a mean value of the sums of the cross-sectional areas of the inner passages 220A, 221A arranged adjacently to the respective energy storage devices 1.

As described above, the cross-sectional areas of the inner passages 220A, 221A arranged adjacently to the respective energy storage devices 1 arranged between the energy storage devices 1 arranged at both ends in the X axis direction mean the cross-sectional areas of the inner passages 220A, 221A in the direction orthogonal to the direction along which a fluid flows (see FIG. 7).

$C_i$ is a constant which is determined based on the kind of cooling medium, the temperature and the flow speed of the cooling medium, the temperature of the energy storage device 1, the thermal conductivity of the case 10 of the energy storage device 1, the thermal conductivity of the spacer 2 and the like.

In this embodiment, the cases 10 of the energy storage devices 1 are formed using the same material and have the same thickness, and the spacers 2 (inner spacers 2A and the outer spacers 2B) are formed using the same material. Further, the same cooling medium is made to flow through the outer passages and the inner passages using the same duct and hence, the cooling medium having substantially the same temperature and flow speed is made to flow along the respective energy storage devices 1. Further, constants $C_o$ and $C_i$ scarcely change when a change in temperatures of the respective energy storage devices 1 is merely approximately 3° C. Accordingly, it is considered that constants $C_o$ and $C_i$ approximate to each other ($C_o \approx C_i$).

Accordingly, a ratio between a mean value $q_o$ of heat transfer amounts of the pair of energy storage devices 1 arranged at both ends and a mean value $q_i$ of heat transfer amounts of the plurality of energy storage devices arranged between the pair of energy storage devices 1 arranged at both ends can be calculated by the following formula 3.

$$q_o/q_i=(A_o \times \sqrt{a_o})/(A_i \times \sqrt{a_i}) \quad \text{[Formula 3]}$$

The energy storage apparatus of Example 1 includes 18 pieces of energy storage devices ($E_1$ to $E_{18}$). Here, the number x in $E_X$ means the order at which the energy storage device 1 is arranged in the X axis direction. That is, $E_1$ and $E_{18}$ mean the pair of energy storage devices 1 arranged at both ends in the X axis direction, and $E_2$ to $E_{17}$ mean the plurality of energy storage devices 1 arranged between the pair of energy storage devices 1.

The energy storage apparatus of Example 1 is configured such that, among the plurality of energy storage devices 1, a ratio ($q_o/q_i$) between a mean value $q_o$ of heat transfer amounts of the pair of energy storage devices 1 arranged at both ends in the X axis direction and a mean value $q_i$ of heat transfer amounts of the energy storage devices 1 arranged between the pair of energy storage devices 1 is set to 1.24.

A more specific description follows. The energy storage apparatus of Example 1 is configured such that, among the plurality of energy storage devices 1, a sum of areas where one energy storage device 1 ($E_1$) out of the pair of energy storage devices 1 arranged at both ends in the X axis direction is in contact with the outer passages 24B and the inner passages 220A arranged adjacently to the energy storage device 1 ($E_1$) is 11,158 mm$^2$, and a sum of areas where the other energy storage device 1 ($E_{18}$) out of the pair of energy storage devices 1 arranged at both ends in the X axis direction is in contact with the outer passages 24B and the inner passages 221A arranged adjacently to the other energy storage device 1 ($E_{18}$) is 10,449 mm$^2$. Accordingly, a mean value $A_o$ of the cooling areas for the pair of energy storage devices 1 arranged at both ends is 10,804 mm$^2$.

The energy storage apparatus of Example 1 is also configured such that a sum of cross-sectional areas of the outer passages 24B and the inner passages 220A arranged adjacently to one energy storage device 1 ($E_1$) out of the pair of energy storage devices 1 arranged at both ends in the X axis direction is 170 mm$^2$, and a sum of cross-sectional areas of the outer passages 24B and the inner passages 221A arranged adjacently to the other energy storage device 1 ($E_{18}$) out of the pair of energy storage devices 1 arranged at both ends in the X axis direction is 158 mm$^2$. Accordingly, a mean value $a_o$ of the cross-sectional areas of the inner passages 22A and the outer passages 24B arranged adjacently to the pair of energy storage devices 1 arranged at both ends is 164 mm$^2$.

The energy storage apparatus of Example 1 is also configured such that, among the plurality of energy storage devices 1, a mean value $A_i$ of cooling areas for the respective energy storage devices 1 ($E_2$ to $E_{17}$) arranged between the pair of energy storage devices 1 arranged at both ends in the X axis direction is 9,675 mm$^2$, and a mean value $a_i$ of cross-sectional areas of the inner passages 220A, 221A arranged adjacently to each of the energy storage devices 1 ($E_2$ to $E_{17}$) is 134 mm$^2$.

Accordingly, the energy storage apparatus of Example 1 is configured such that a ratio ($q_o/q_i$) between a mean value $q_o$ of heat transfer amounts of the pair of energy storage devices 1 arranged at both ends in the X axis direction and a mean value $q_i$ of heat transfer amounts of the respective energy storage devices 1 arranged between the pair of energy storage devices 1 is set to 1.24. Further, in the energy storage apparatus of Example 1, $A_o \times \sqrt{a_o}$ is 138,359 mm$^2$ ($A_o \times \sqrt{a_o}$=138,359 mm$^2$) and $A_i \times \sqrt{a_i}$ is 111,996 mm$^2$ ($A_i \times \sqrt{a_i}$=111,996 mm$^2$) so that the energy storage apparatus of Example 1 is configured to satisfy the relation $A_o \times \sqrt{a_o} > A_i \times \sqrt{a_i}$.

In the same manner as in the energy storage apparatus of Example 1, an energy storage apparatus of Example 2 includes 18 pieces of energy storage devices ($E_1$ to $E_{18}$). The energy storage apparatus of Example 2 is configured such that, among a plurality of energy storage devices 1, a ratio ($q_o/q_i$) between a mean value $q_o$ of heat transfer amounts of a pair of energy storage devices 1 arranged at both ends in the X axis direction and a mean value $q_i$ of heat transfer amounts of respective energy storage devices 1 arranged between the pair of energy storage devices 1 is set to 1.51.

A more specific description follows. The energy storage apparatus of Example 2 is configured such that, among the plurality of energy storage devices 1, a sum of areas where one energy storage device 1 ($E_1$) out of the pair of energy storage devices 1 arranged at both ends in the X axis direction is in contact with outer passages 24B and inner passages 220A arranged adjacently to the energy storage device 1 ($E_1$) is 11,578 mm$^2$, and a sum of areas where the other energy storage device 1 ($E_{18}$) out of the pair of energy storage devices 1 arranged at both ends in the X axis direction is in contact with outer passages 24B and inner passages 221A arranged adjacently to the other energy storage device 1 ($E_{18}$) is 10,870 mm$^2$. Accordingly, a mean value $A_o$ of the cooling areas for the pair of energy storage devices 1 arranged at both ends is 11,224 mm$^2$.

The energy storage apparatus of Example 2 is also configured such that a sum of cross-sectional areas of the outer passages 24B and the inner passages 220A arranged adjacently to one energy storage device 1 ($E_1$) out of the pair of energy storage devices 1 arranged at both ends in the X axis direction is 194 mm$^2$, and a sum of cross-sectional areas of the outer passages 24B and the inner passages 221A arranged adjacently to the other energy storage device 1 ($E_{18}$) out of the pair of energy storage devices 1 arranged at both ends in the X axis direction is 185 mm$^2$. Accordingly, a mean value $a_o$ of the cross-sectional areas of the inner passages 22A and the outer passages 24B arranged adjacently to the pair of energy storage devices 1 arranged at both ends is 189.5 mm$^2$.

The energy storage apparatus of Example 2 is also configured such that, among the plurality of energy storage devices 1, a mean value $A_i$ of cooling areas for the respective energy storage devices 1 ($E_2$ to $E_{17}$) arranged between the pair of energy storage devices 1 arranged at both ends in the X axis direction is 9,483 mm$^2$, and a mean value $a_i$ of cross-sectional areas of the inner passages 220A, 221A arranged adjacently to the respective energy storage devices 1 ($E_2$ to $E_{17}$) is 117 mm$^2$.

Accordingly, the energy storage apparatus of Example 2 is configured such that a ratio ($q_o/q_i$) between a mean value $q_o$ of the heat transfer amounts of the pair of energy storage devices 1 arranged at both ends in the X axis direction and a mean value $q_i$ of the heat transfer amounts of the respective energy storage devices 1 arranged between the pair of energy storage devices 1 is set to 1.506 (≈1.51). Further, in the energy storage apparatus of Example 2, $A_o \times \sqrt{a_o}$ is 154,508 mm² ($A_o \times \sqrt{a_o}$=154,508 mm²) and $A_i \times \sqrt{a_i}$ is 102,574 mm² ($A_i \times \sqrt{a_i}$=102,574 mm²) so that the energy storage apparatus of Example 2 is configured to satisfy the relation $A_o \times \sqrt{a_o} > A_i \times \sqrt{a_i}$.

(Method of Measuring Electric Current Value Y)

Firstly, a state is provided where a cooling fluid set to a temperature of 25° C. is supplied to the energy storage apparatus at a flow rate of X ($m^3$/h), and a constant current discharge of the energy storage devices 1 connected in series is performed at an electric current value Y (A). Then, temperatures of the respective energy storage devices 1 are measured at a point of time that 600 seconds elapse. Then, a constant current discharge of the energy storage devices 1 is performed again at a larger electric current value Y (A), and temperatures of the respective energy storage devices 1 are measured again at a point of time that 600 seconds elapse.

In this manner, temperatures of the respective energy storage devices 1 are measured while gradually increasing an electric current value Y of the energy storage devices 1. An electric current value Y of the energy storage devices 1 at a point of time when the temperature of any one of the plurality of energy storage devices 1 exceeds 40° C. is taken as a maximum electric current value Y of the energy storage devices 1. A flow rate X of the fluid was set to 52.5 ($m^3$/h) (a flow rate of the fluid supplied to one energy storage device 1 was set to 2.92 ($m^3$/h)), and electric current values Y of energy storage apparatuses of Examples 1, 2 were measured. The results are shown in Table 1.

Temperatures of the energy storage devices 1 in Table 1 indicate values at a point of time when the temperature of any one of the plurality of energy storage devices 1 exceeds 40° C.

There has been a demand for an energy storage apparatus where a foreign material is minimally caught between an end plate and an insulating member.

An energy storage apparatus includes: at least one energy storage device; a holder which holds the energy storage device and includes end plates each arranged along the energy storage device; and spacers which are arranged between the end plates and the energy storage device, wherein the spacer includes: a base which is disposed adjacently to the energy storage device; and a first projecting portion which projects toward the end plate from the base and is in contact with the end plate.

With this configuration, the spacer is in contact with the end plate by way of a distal end (a distal end in the projecting direction) of the first projecting portion so that a gap is formed between the base and the end plate whereby a contact area between the spacer and the end plate can be reduced. As a result, a foreign material is minimally caught between the end plate and the spacer.

(2) The energy storage apparatus having the configuration (1) may preferably be configured such that the holder includes a connecting member which is arranged with respect to the energy storage device in a first direction along which the energy storage devices and the end plate are adjacently arranged, the connecting member having a fixing portion connected to the end plates, and the first projecting portion is arranged at least between the fixing portion and the base.

With this configuration, when a force directed in the direction toward the energy storage device from the end plate is applied to the end plate by the connecting member, such a force is efficiently transmitted to the energy storage device from the end plate by way of an insulating member (to be more specific, the first projecting portion).

TABLE 1

| | Temperatures of energy storage devices (° C.) | | | | | | | | | | | | | | | | | | Electric current |
|---|---|---|---|---|---|---|---|---|---|---|---|---|---|---|---|---|---|---|---|
| | $E_1$ | $E_2$ | $E_3$ | $E_4$ | $E_5$ | $E_6$ | $E_7$ | $E_8$ | $E_9$ | $E_{10}$ | $E_{11}$ | $E_{12}$ | $E_{13}$ | $E_{14}$ | $E_{15}$ | $E_{16}$ | $E_{17}$ | $E_{18}$ | (A) |
| Example 1 | 39.4 | 39 | 38.8 | 38.1 | 37.5 | 37.6 | 37.1 | 37.4 | 37.8 | 38 | 37.6 | 38 | 37.7 | 38.1 | 38.6 | 38.9 | 39.9 | 40.2 | 80 |
| Example 2 | 39.7 | 40 | 40 | 40 | 39.9 | 39.8 | 39.8 | 40.1 | 39.8 | 39.7 | 39.3 | 38.9 | 39 | 39.2 | 39.6 | 39.7 | 39.5 | 39.2 | 92 |

Figure 14:
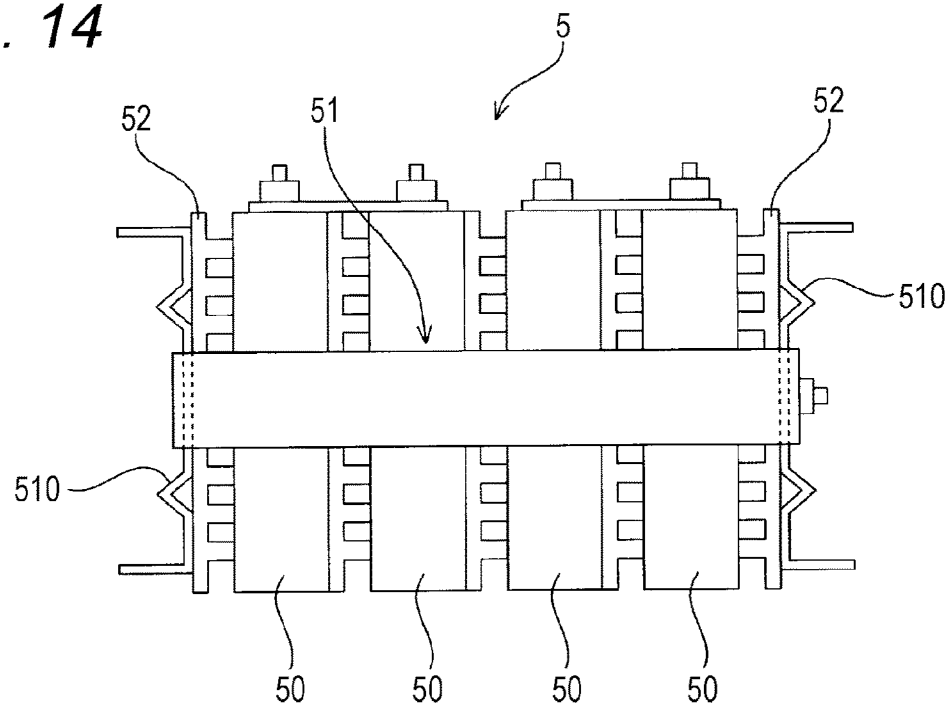
FIG. 14 is a cross-sectional view of a conventional energy storage apparatus.

An electric vehicle requires a power source having a large capacity and hence, an energy storage apparatus which includes a plurality of energy storage devices is used. As shown in FIG. 14, the energy storage apparatus of this type includes: an energy storage device group consisting of a plurality of energy storage devices 50 arranged in a row; a holder 51 which collectively holds the plurality of energy storage devices 50 arranged in a row, and includes a pair of end plates 510, 510 arranged at both ends of the energy storage devices 50 arranged in a row; and an insulating member 52 which insulates the holder 51 and the energy storage devices 50 from each other (see Japanese patent No. 4501080).

In steps of manufacturing the above-mentioned energy storage apparatus 5, there may arise a case where when a foreign material such as dust is caught between the end plate 510 and the insulating member 52, a distance between the pair of end plates 510, 510 is changed so that a force applied to the energy storage device 50 from the end plate 510 by way of the insulating member 52 becomes non-uniform in the direction toward a contact surface (that is, magnitude of a force applied to the energy storage device 50 becomes non-uniform).

(3) In the energy storage apparatus having the configuration (1) or (2), it is preferable that the spacer include a second projecting portion which projects toward the energy storage device from the base and is in contact with the energy storage device, and the second projecting portion be arranged at a position where the second projecting portion overlaps with the first projecting portion in the first direction.

With this configuration, a gap is formed between the spacer and the energy storage device and hence, heat generated by the energy storage device can be easily discharged to the outside (outside the energy storage apparatus). Further, the first projecting portion and the second projecting portion overlap with each other in the first direction with the base interposed therebetween and hence, when a force directed in the direction toward the energy storage device from the end plate is applied to the end plate by the connecting member along the first direction, such a force is efficiently transmitted to the energy storage device.

(4) The energy storage apparatus having the configuration (3) may be configured as follows. The base extends in the direction orthogonal to the first direction. The first projecting portion is formed of a plurality of first projecting portions. The plurality of first projecting portions are projecting ridges arranged parallel to each other at intervals in the direction orthogonal to the first direction. The second projecting portion is formed of a plurality of second projecting portions. The plurality of second projecting portions are projecting ridges which extend in the same direction as the direction that the first projecting portions extend, at positions where the second projecting portions and the first projecting portions overlap with each other in the first direction.

With this configuration, a plurality of passages (spaces each of which is defined between the first projecting ridges arranged adjacent to each other) which extend in one direction and allow air to pass therethrough are defined between the spacer and the energy storage device and, at the same time, the plurality of first projecting ridges and the plurality of second projecting ridges are in contact with the energy storage device and the end plate. Accordingly, a cooling efficiency of the energy storage device can be enhanced by allowing air to flow through the passages while sufficiently ensuring efficiency of transmitting a force to the energy storage device from the end plate.

(5) In the spacer of the energy storage apparatus having the configuration (3) or (4), the length of the first projecting portion in the projecting direction may be shorter than the length of the second projecting portion in the projecting direction.

(6) In the energy storage apparatus having any one of the configurations (1) to (5), the end plate may be made of a metal material.

The thermal conductivity of metal is higher than the thermal conductivity of resin and the like so that when the end plate is made of metal, heat outside the energy storage apparatus is easily transferred to an energy storage device side. However, in the energy storage apparatus having the above-mentioned configuration, a gap (space which allows air to pass therethrough) is formed between the end plate and the spacer and hence, even when the end plate is made of metal, heat transferred to the energy storage device side from the outside through the end plate is minimally transferred to the energy storage device.

By forming the end plate using metal, the thickness of the end plate can be reduced while ensuring a sufficient strength of the end plate. Accordingly, the energy storage apparatus can be miniaturized.

(7) In the energy storage apparatus having any one of the configurations (1) to (5), the spacer may have a fitting portion which engages with the end plate in fitting engagement at a position where the base faces the end plate.

With this configuration, relative positions between the end plate and the spacer can be surely restricted.

(8) In the energy storage apparatus having the configuration (7), it is preferable that a gap be formed between the first projecting portion and the fitting portion.

With this configuration, when the end plate and the fitting portion of the spacer engage with each other by fitting engagement, a foreign material generated by rubbing between the end plate and the fitting portion passes through the gap and hence, the foreign material generated by rubbing is minimally caught between the first projecting portion and the end plate.

(9) In the energy storage apparatus having any one of the configurations (1) to (8), an area of a portion of the first projecting portion which is in contact with the end plate may be smaller than a cross-sectional area of an end portion of the first projecting portion on a base side.

In this manner, by making the area of the portion of the first projecting portion at a distal end in the projecting direction which is in contact with the end plate smaller than a proximal portion (a portion on the base side) of the first projecting portion, a foreign material is more minimally caught between the end plate and the spacer.

Figure 10:
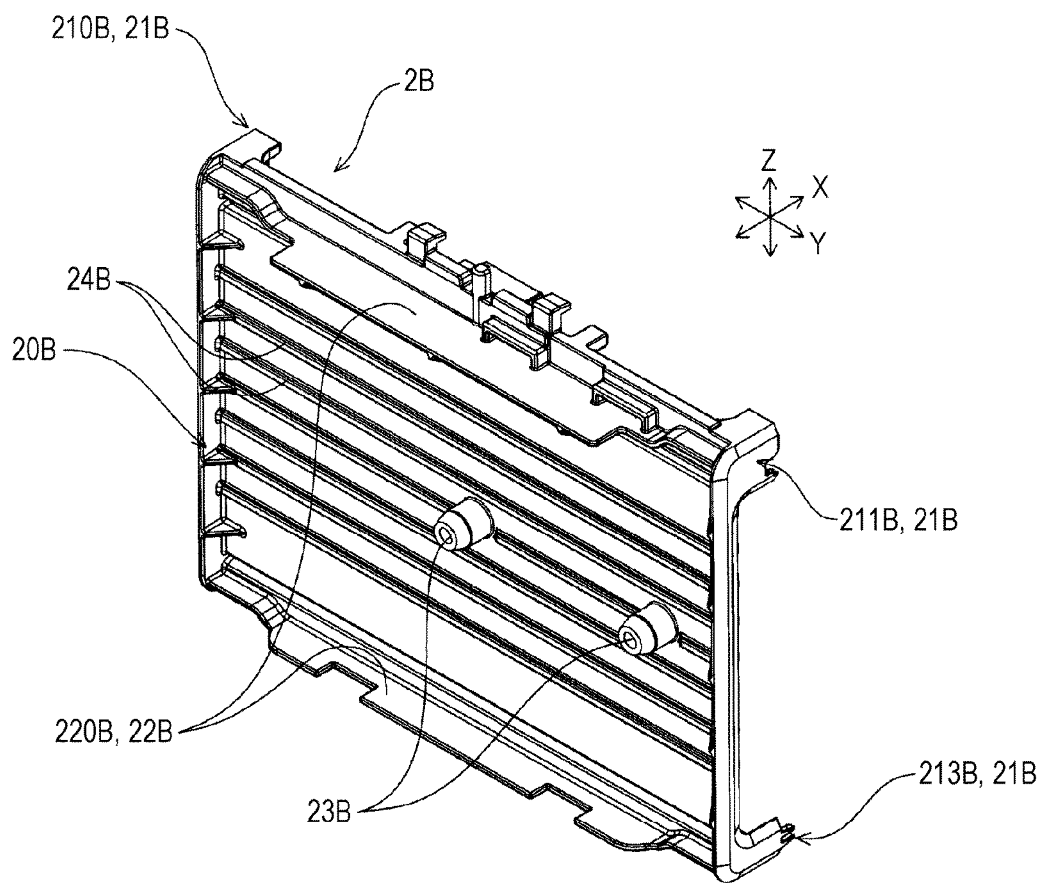
FIG. 10 is a perspective view of an outer spacer of an energy storage apparatus according to one embodiment of the present invention.
Figure 11:
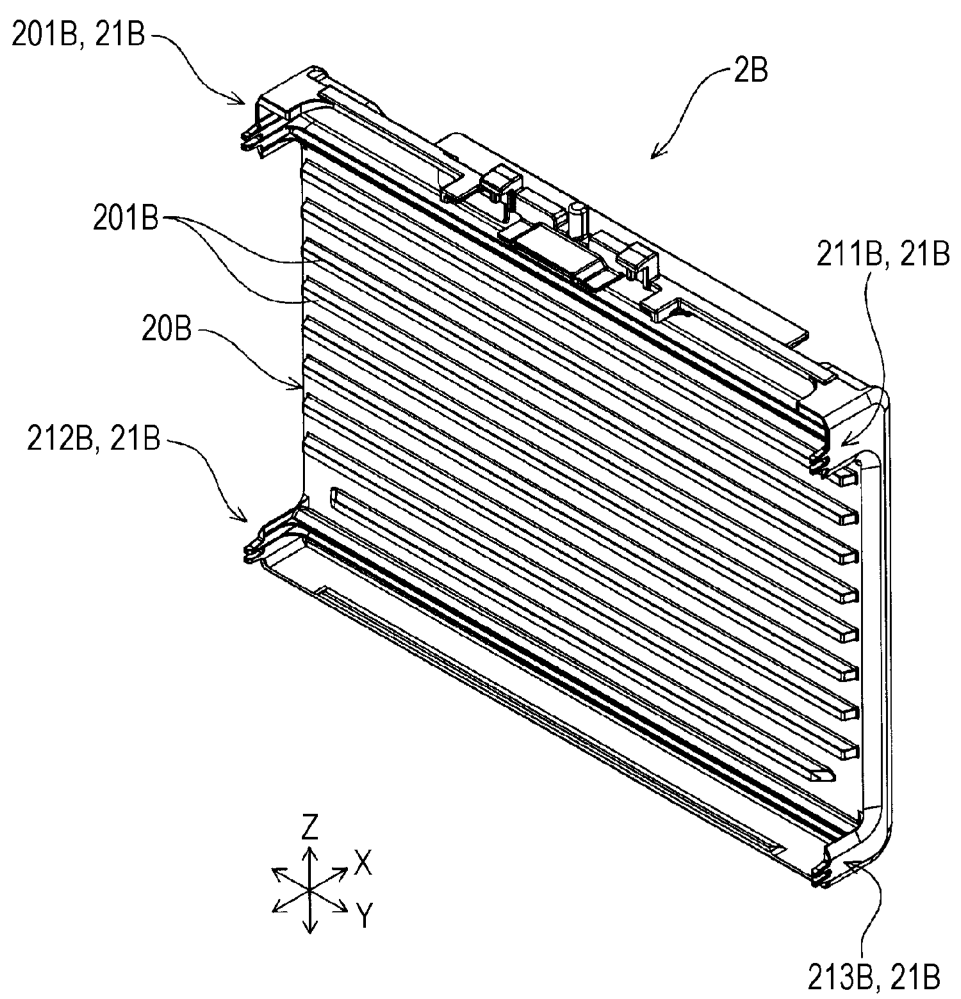
FIG. 11 is a perspective view of the outer spacer of the energy storage apparatus according to the embodiment.
Figure 12:
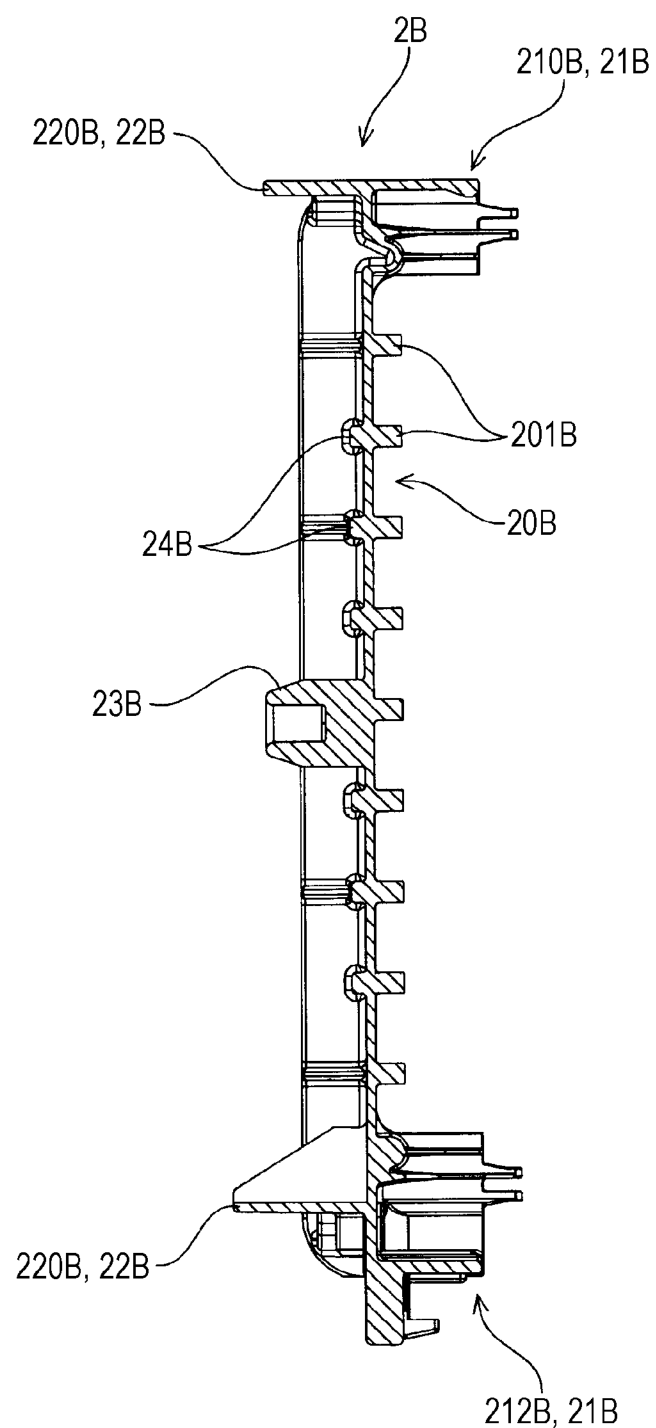
FIG. 12 is a cross-sectional view of the outer spacer of the energy storage apparatus according to the embodiment.
Figure 13:
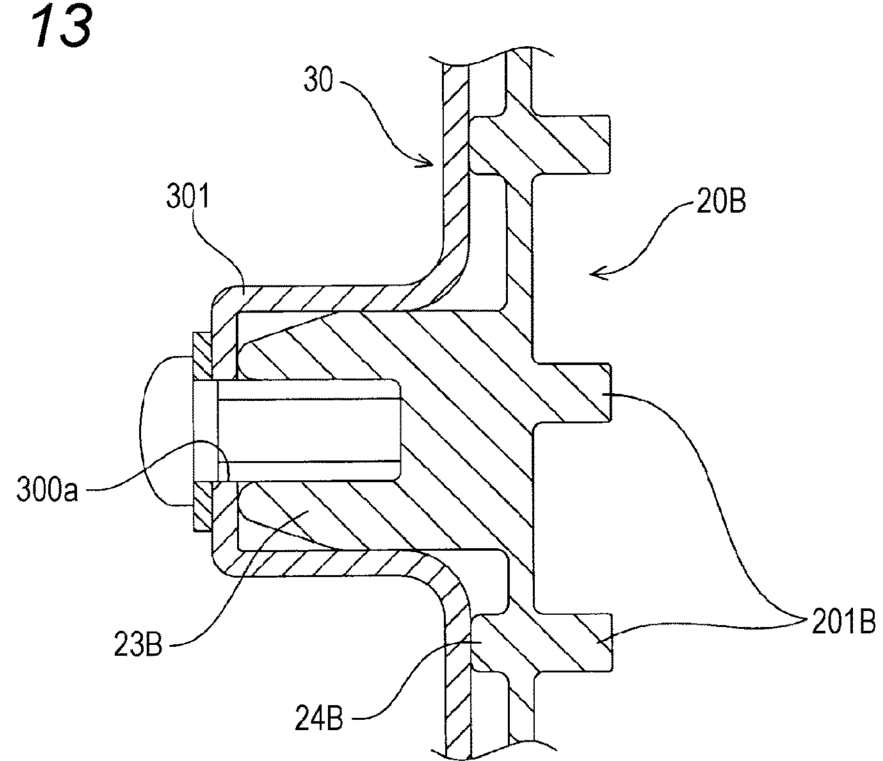
FIG. 13 is a cross-sectional view of a portion of the energy storage apparatus according to the embodiment.

An outer spacer 2B is disposed between an energy storage device 1 and an end plate 30. With such a configuration, as shown in FIG. 10 to FIG. 12, the outer spacer 2B has fitting portions 23B which engage with the end plate 30 by fitting engagement at the position where the base 20B faces the end plate 30. That is, as shown in FIG. 10, the outer spacer 2B has the fitting portions 23B which determine the position of the end plate 30 with respect to the base 20B. The fitting portions 23B are formed on a second surface of the base 20B. The outer spacer 2B also has positioning portions 22B which prevent the positional displacement of the end plate 30 with respect to the base 20B. The positioning portions 22B project from the second surface of the base 20B.

The outer spacer 2B includes first projecting portions 24B which project toward the end plate 30 from the second surface of the base 20B, and are in contact with the end plate 30. The first projecting portions 24B are hereinafter referred to as "outer contact portions". In this embodiment, the outer spacer 2B includes second projecting portions 201B which project toward the energy storage device 1 from a first surface of the base 20B. The second projecting portions 201B are in contact with the energy storage device 1. The second projecting portions 201B are hereinafter referred to as "inner contact portions").

The base 20B of the outer spacer 2B extends in the Y axis direction and the Z axis direction which are orthogonal to the X axis direction. That is, the base 20B is formed in a plate shape. The base 20B of the outer spacer 2B has: a first end arranged at the position corresponding to the lid plate 101 of the energy storage device 1; and a second end disposed on a side opposite to the first end and arranged at the position corresponding to the closing portion 100*a* of the energy storage device 1. The base 20B of the outer spacer 2B also has a third end arranged at the position corresponding to one second wall 100*d* of the energy storage device 1; and a fourth end disposed on a side opposite to the third end and arranged at the position corresponding to the other second wall 100*d* of the energy storage device 1.

The base 20B of the outer spacer 2B has: a first corner portion where the first end and the third end are connected to each other; and a second corner portion where the first end and the fourth end are connected to each other. The base 20B of the outer spacer 2B also has: a third corner portion where the second end and the third end are connected to each other; and a fourth corner portion where the second end and the fourth end are connected to each other.

The first end and the second end of the base 20B of the outer spacer 2B extend in the Y axis direction. The third end and the fourth end of the base 20B of the outer spacer 2B extend in the Z axis direction. Accordingly, the base 20B of the outer spacer 2B has an approximately rectangular shape. The base 20B of the outer spacer 2B has a size substantially equal to the size of a first wall 100*c* of the energy storage device 1.

In this embodiment, the outer contact portions 24B are projecting ridges extending in the Y axis direction. An area of a portion of the outer contact portion 24B which is in contact with the end plate 30 is smaller than a cross-sectional area of the end portion of the outer contact portion 24B on a base 20B side. That is, the width of the outer contact portion 24B in the Z axis direction (the direction orthogonal to the long side direction of the outer contact portion 24B) is set larger at a proximal end of the outer contact portion 24B which is connected to the base 20B than at a distal end of the outer contact portion 24B which is in contact with the end plate 30.

The outer contact portion 24B is formed of a plurality of outer contact portions 24B. As described above, in this embodiment, the outer contact portions 24B are the projecting ridges extending in the Y axis direction. With such a configuration, the plurality of outer contact portions 24B are arranged parallel to each other at intervals in the Z axis direction. The outer contact portions 24B are arranged while avoiding the fitting portions 23B.

In this embodiment, the outer contact portions 24B are arranged so as to be positioned at least between a connecting portion between the end plate 30 and a connecting member 31 described later and the base 20B of the outer spacer 2B. That is, the outer contact portions 24B are arranged at least between a fixing portion 313 described later of the connecting member and the base 20B of the outer spacer 2B.

As described above, the plurality of outer contact portions 24B are formed on the base 20B. Out of the plurality of outer contact portions 24B, at least one outer contact portion 24B overlaps with the fixing portion 313 of the connecting member 31 in the X axis direction. With such a configuration, the outer contact portions 24B are arranged between the base 20B of the outer spacer 2B and the fixing portion 313 of the connecting member 31.

As described above, the plurality of outer contact portions 24B are the projecting ridges extending in the Y axis direction, and are arranged parallel to each other at intervals in the Z axis direction. With such a configuration, out of the plurality of outer contact portions 24B, a portion of at least one outer contact portion 24B overlaps with the fixing portion 313 of the connecting member 31.

In this embodiment, the connecting member 31 is connected to one end plate 30 at four connecting portions. With such a configuration, at respective four connecting portions, portions of some of the plurality of outer contact portions 24B overlap with the fixing portions 313 in the X axis direction so that some of the plurality of outer contact portions 24B are arranged between the fixing portions 313 (first fixing portions 313*a* described later, second fixing portions 313*b* described later) and the base 20B.

In this embodiment, the fixing portions 313 of the connecting members 31 are connected to the respective four corners of the end plate 30. The plurality of outer contact portions 24B are arranged over the approximately whole region of the base 20B. That is, the plurality of outer contact portions 24B are arranged on the base 20B over a region corresponding to an approximately whole region of an opposedly-facing surface (first surface) of the end plate 30. With such a configuration, out of the plurality of outer contact portions 24B arranged parallel to each other in the Z axis direction, at least the outer contact portions 24B disposed at both ends in the Z axis direction overlap with the respective fixing portions 313 (the first fixing portions 313*a* and the second fixing portions 313*b*).

In this embodiment, passages which allow a fluid to flow therethrough are formed between the first surface of the base 20B of the outer spacer 2B and the energy storage device 1.

A more specific description follows. As described above, the outer spacer 20B has inner contact portions 201B which project toward the energy storage device 1 from the base 20B and are in contact with the energy storage device 1. That is, the outer spacer 2B has the inner contact portions 201B which extend toward the case 10 (a first wall 100*c* of a case body 100) of the energy storage device 1 from the first surface of the base 20B.

The inner contact portion 201B has a long side thereof in the Y axis direction. In this embodiment, the outer spacer 2B has a plurality of inner contact portions 201B. The plurality of inner contact portions 201B are arranged at intervals in the Z axis direction (the direction orthogonal to the long side direction of the inner contact portion 201B). With this configuration, the plurality of passages (not indicated by numeral in the drawing) are defined between the base 20B of the outer spacer 2B and the energy storage device 1.

The inner contact portions 201B are arranged at a position which overlaps with the outer contact portions 24B in the X axis direction.

In this embodiment, the inner contact portion 201B is formed of a plurality of inner contact portions 201B. The plurality of inner contact portions 201B are projecting ridges which extend in the same direction as the direction that the corresponding outer contact portions 24B extend, at the positions where the inner contact portions 201B overlap with the outer contact portions 24B in the X axis direction.

The plurality of inner contact portions 201B maintain a distance between the energy storage device 1 and the base 20B of the outer spacer 2B at a fixed value, and define a plurality of passages (not indicated by numeral in the drawing) between the base 20B and the energy storage device 1 in a penetrating manner in the Y axis direction.

The length of the outer contact portion 24B in the projecting direction (X axis direction) is shorter than the length of the inner contact portion 201B in the projecting direction (X axis direction). That is, a projecting length of the inner contact portion 201B from the base 20B is larger than a projecting length of the outer contact portion 24B from the base 20B. Accordingly, the base 20B is arranged in a state where the base is closer to an end plate 30 side with respect to a center position in the X axis direction in a region between the end plate 30 and the energy storage device 1.

As described above, the first surface of the outer spacer 2B is arranged adjacently to the energy storage device 1. To restrict the relative movement of the energy storage devices 1 arranged adjacently to the first surface of the outer spacer 2B, the restricting portions 21B extend toward the energy storage device 1 arranged adjacently to the first surface of the base 20B.

A more specific description follows. The outer spacer 2B includes, as the restricting portions 21B: restricting portions 21B formed at the first end of the base 20B; and restricting portions 21B formed at the second end of the base 20B.

The outer spacer 2B includes, as the restricting portions 21B: a first restricting portion 210B formed on a first corner portion; a second restricting portion 211B formed on a second corner portion; a third restricting portion 212B formed on a third corner portion; and a fourth restricting portion 213B formed on a fourth corner portion.

As described above, the first surface of the base 20B faces the energy storage device 1 in an opposed manner. Accordingly, the first restricting portion 210B and the second restricting portion 211B extend toward the energy storage device 1 arranged adjacently to the first surface of the base 20B.

The first restricting portion 210B is in contact with a first end of the lid plate 101 and the second wall 100*d* of a barrel portion 100*b* of the energy storage device 1 arranged adjacently to the first surface of the base 20B. The second restricting portion 211B is in contact with a second end of the lid plate 101 and a second wall 100*d* of the barrel portion

100*b* of the energy storage device 1 arranged adjacently to the first surface of the base 20B.

As described above, the first surface of the base 20B faces the energy storage device 1 in an opposed manner. Accordingly, the third restricting portion 212B and the fourth restricting portion 213B extend toward the energy storage device 1 arranged adjacently to the first surface of the base 20B.

The third restricting portion 212B is in contact with a first end of a closing portion 100*a* and the second wall 100*d* of the barrel portion 100*b* of the energy storage device 1 arranged adjacently to the first surface of the base 20B. The fourth restricting portion 213B is in contact with the second end of the closing portion 100*a* and the second wall 100*d* of the barrel portion 100*b* of the energy storage device 1 arranged adjacently to the first surface of the base 20B.

The positioning portions 22B are formed of a plurality of members 220B which extend from outer peripheral edge portions of the base 20B. That is, in this embodiment, the members 220B extend toward the end plate 30 from the first end, the second end, the third end and the fourth end of the base 20B.

The positioning portions 22B (the plurality of members 220B) engage with the end plate 30 in fitting engagement in a state where the positioning portions 22B surround an outer periphery of the end plate 30.

The fitting portions 23B project toward the end plate 30 described later from the base 20B. A more specific description follows. In this embodiment, the fitting portions 23B are formed into a shaft shape and project from the second surface of the base 20B. The fitting portions 23B are formed such that the fitting portions 23B can be fitted in receiving portions formed in the end plate 30. The fitting portion 23B has a threaded hole (not indicated by numeral in the drawing) which is formed by drilling the fitting portion 23B toward a proximal end (base 20B) thereof from a distal end thereof.

As described above, both the fitting portions 23B and the outer contact portions 24B project from the second surface of the base 20B. The plurality of outer contact portions 24B are formed on the base 20B at intervals in the Z axis direction and hence, some of the plurality of outer contact portions 24B are arranged at a position which overlaps with the fitting portions 23B in the Y axis direction. In this embodiment, a gap is formed between the outer contact portion 24B and the fitting portion 23B. That is, the outer contact portion 24B extending in the Y axis direction does not reach outer peripheries of the fitting portions 23B.

As described above, the outer contact portions 24B project toward the end plate 30 from the base 20B, and are in contact with the end plate 30. With such a configuration, a gap is formed between the outer spacer 2B and the end plate 30 in the energy storage apparatus.

In this embodiment, as described above, the outer spacer 2B is arranged adjacently to the inner spacer with the energy storage device 1 interposed therebetween. The outer spacers 2B are arranged adjacently to the energy storage devices 1 at outermost ends out of the plurality of energy storage devices 1. That is, the pair of outer spacers 2B is provided so as to sandwich the plurality of energy storage devices 1 arranged in a row therebetween.

As described above, the first surfaces of the pair of outer spacers 2B face the case bodies 100 of the energy storage devices 1 in an opposed manner. Accordingly, the pair of outer spacers 2B is arranged such that the first surfaces of the bases 20B are directed to each other. Accordingly, in the energy storage apparatus, the pair of outer spacers 2B is arranged symmetrically in the direction along which the plurality of energy storage devices 1 are arranged in a row (X axis direction).

In this embodiment, a holder 3 is made of metal. As shown in FIG. 4, the holder 3 includes: a pair of end plates 30 each of which is arranged at the position adjacently to the corresponding outer spacer 2B; and connecting members 31 which connect the pair of end plates 30 to each other.

Each of the pair of end plates 30 has: a first surface which faces the outer spacer 2B in an opposed manner; and a second surface which is disposed on a side opposite to the first surface. Each of the pair of end plates 30 has a pressure contact portion 300 which is in contact with the outer contact portion 24B extending from the base 20B of the outer spacer 2B.

The end plate 30 has: a first end arranged at the position corresponding to the lid plate 101 of the energy storage device 1; and a second end disposed on a side opposite to the first end and arranged at the position corresponding to the closing portion 100*a* of the energy storage device 1. The end plate 30 also has: a third end arranged at the position corresponding to one second wall 100*d* of the energy storage device 1; and a fourth end disposed on a side opposite to the third end and arranged at the position corresponding to the other second wall 100*d* of the energy storage device 1.

With such a configuration, the end plate 30 has a first corner portion where the first end and the third end are connected to each other; and a second corner portion where the first end and the fourth end are connected to each other. The end plate 30 also has: a third corner portion where the second end and the third end are connected to each other; and a fourth corner portion where the second end and the fourth end are connected to each other.

The pressure contact portion 300 has insertion holes 300*a* at positions corresponding to the fitting portions 23B of the outer spacer 2B. A male screw which is to be threadedly engaged with a threaded hole of the fitting portion 23B is inserted into the insertion hole 300*a*.

A more specific description follows. The end plate 30 has receiving portions 301 into which the fitting portions 23B of the outer spacer 2B are fitted. The receiving portion 301 is a recessed portion opened on the first surface of the end plate 30 which faces the outer spacer 2B in an opposed manner. The receiving portion 301 has an inner diameter substantially equal to an outer diameter of the fitting portion 23B.

The insertion hole 300*a* is a hole having a diameter smaller than an inner diameter of the fitting portion 23B, and penetrates the center of the receiving portion 301. In this embodiment, the receiving portion 301 is formed by indenting a portion of the pressure contact portion 300. That is, the end plate 30 is formed by molding a metal plate by a press where the receiving portion 301 having a recessed shape which is opened on the first surface is formed by projecting a portion of the pressure contact portion 300 toward a second surface side. The end plate 30 has the through holes 300*b* at respective corner portions thereof disposed on a periphery of the pressure contact portion 300.

The connecting members 31 are arranged so as to extend along the energy storage devices 1 in the X axis direction (the direction along which the energy storage devices 1 and the end plates 30 are arranged in a row). The connecting member 31 has the fixing portions 313 connected to the respective end plates 30. The connecting member 31 also has a pair of support portions 312 connected to the first connecting portion 310 and the second connecting portion 311.

A more specific description follows. The connecting member 31 has a pair of first connecting portions 310 which extends between the pair of end plates 30, and is arranged at the positions corresponding to the lid plates 101 of the energy storage devices 1; and a pair of second connecting portions 311 which extends between the pair of end plates 30, and is arranged at the positions corresponding to the closing portions 100*a* of the energy storage devices 1.

Each of the pair of first connecting portions 310 has a first end and a second end disposed on a side opposite to the first end in the X axis direction (the direction which forms a long side).

Each of the pair of first connecting portions 310 is bent in the direction orthogonal to the direction which forms the long side. The first connecting portion 310 has two members disposed on both sides when a ridge extending in the X axis direction is set as a boundary, and a right angle is formed between the two members. In each of the pair of first connecting portions 310, when a bent portion (ridge) is set as a boundary, one member (one member out of the two members) is arranged at a position corresponding to the lid plate 101 of the energy storage device 1. In each of the pair of first connecting portions 310, when the bent portion (ridge) is set as a boundary, the other member (the other member out of the two members) is arranged at a position corresponding to the second wall 100*d* of the energy storage device 1.

Each of the pair of second connecting portions 311 has a first end and a second end disposed on a side opposite to the first end in the X axis direction (the direction which forms a long side).

The second connecting portion 311 is bent in the direction orthogonal to the direction which forms the long side. That is, the second connecting portion 311 has two members disposed on both sides when a ridge extending in the X axis direction is set as a boundary, and a right angle is formed between the two members. When a bent portion (ridge) of the second connecting portion 311 is set as a boundary, one member (one member out of the two members) of the second connecting portion 311 is arranged at a position corresponding to the lid plate 101 of the energy storage device 1. When the bent portion (ridge) of the second connecting portions 311 is set as a boundary, the other member (the other member out of the two members) of the second connecting portions 311 is arranged at a position corresponding to the second wall 100*d* of the energy storage device 1.

The support portion 312 includes: a first support portion 312*a* which is connected to the first end of the first connecting portion 310 and the first end of the second connecting portion 311; and a second support portion 312*b* which is connected to the second end of the first connecting portion 310 and the second end of the second connecting portion 311.

The fixing portions 313 are configured to be arranged on the end plates 30 in an overlapping manner from the outside. A more specific description follows. The fixing portions 313 include: a pair of first fixing portions 313*a* which extends from the first end and the second end of each of the pair of first connecting portions 310; and a pair of second fixing portions 313*b* which extends from the first end and the second end of each of the pair of second connecting portions 311.

One first fixing portion 313*a* faces a peripheral portion of the through hole 300*b* formed in an outer surface (second surface) of one end plate 30. The other first fixing portion 313*a* faces a peripheral portion of the through hole 300*b* formed in an outer surface (second surface) of the other end plate 30. A first hole 313*c* is formed in the pair of first fixing portions 313*a* at positions corresponding to the through holes 300*b*.

Accordingly, the first connecting portion 310 is connected to the end plates 30 by threadedly mounting nuts on bolts which pass through the through holes 300*b* formed in the end plates 30 and the first holes 313*c* formed in the first fixing portions 313*a*.

One second fixing portion 313*b* faces a peripheral portion of the through hole 300*b* formed in an outer surface (second surface) of one end plate 30. The other second fixing portion 313*b* faces a peripheral portion of the through hole 300*b* formed in an outer surface (second surface) of the other end plate 30. A second hole 313*d* is formed in the pair of second fixing portions 313*b* at positions corresponding to the through holes 300*b*.

Accordingly, the second connecting portion 311 is connected to the end plates 30 by threadedly mounting nuts on bolts which pass through the through holes 300*b* formed in the end plates 30 and the second holes 313*d* formed in the second fixing portions 313*b*.

In this manner, the fixing portion 313 has the pair of first fixing portions 313*a* and the pair of second fixing portions 313*b* and hence, the connecting members 31 are connected to one end plate 30 at four connecting portions. Accordingly, the four respective connecting portions partially overlap with the outer contact portions 24B in the X axis direction so that the outer contact portions 24B are arranged between the fixing portion 313 (the first fixing portion 313*a*, the second fixing portion 313*b*) and the base 20B.

An insulator 4 is made of a material having an insulation property. The insulator 4 has: a pair of first insulating portions 40 arranged between the pair of respective first connecting portions 310 and the spacers 2 (the inner spacers 2A and the outer spacers 2B); and a pair of second insulating portions 41 arranged between the pair of respective second connecting portions 311 and the spacers 2 (the inner spacers 2A and the outer spacers 2B).

Each of the pair of first insulating portions 40 has a long side in the X axis direction (the same direction as the direction of the first connecting portion 310). One first insulating portion 40 is sandwiched between one first connecting portion 310 and the spacers 2. The one first insulating portion 40 is bent in the direction orthogonal to the direction which forms the long side. That is, the first insulating portion 40 has two members disposed on both sides when a ridge extending in the X axis direction is set as a boundary, and a right angle is formed between the two members. When a bent portion (ridge) of the one first insulating portion 40 and a bent portion (ridge) of the one first connecting portion 310 are set as boundaries, one portion (one member out of the two members) of the first insulating portion 40 is in contact with one portion (one member out of the two members) of the first connecting portion 310. Further, when the bent portion (ridge) of the one first insulating portion 40 and the bent portion (ridge) of the one first connecting portion 310 are set as boundaries, the other portion (the other member) of the first insulating portion 40 is in contact with the other portion (the other member) of the first connecting portion 310.

Each of the pair of second insulating portions 41 has a long side in the X axis direction (the same direction as the direction of the second connecting portion 311). One second insulating portion 41 is sandwiched between one second connecting portion 311 and the spacers 2. The one second insulating portion 41 is bent in the direction orthogonal to the direction which forms the long side. That is, the second insulating portion 41 has two members disposed on both sides when a ridge extending in the X axis direction is set as a boundary, and a right angle is formed between the two members. When a bent portion (ridge) of the one second insulating portion 41 and the bent portion (ridge) of the one second connecting portion 311 are set as boundaries, one portion (one member out of the two members) of the one second insulating portion 41 is in contact with one portion (one member) of the one second connecting portion 311. Further, when the bent portion (ridge) of the one second insulating portion 41 and the bent portion (ridge) of the one second connecting portion 311 are set as boundaries, the other portion (the other member out of the two members) of the one second insulating portion 41 is in contact with the other portion (the other member) of the one second connecting portion 311.

As described above, the energy storage apparatus according to this embodiment includes: at least one energy storage device 1; the holder 3 which holds the energy storage device 1 and includes end plates 30 each arranged along the energy storage device; and the spacers (outer spacers) 2B which are arranged between the end plate 30 and the energy storage device 1, wherein the spacer 2B includes: a base 20B disposed adjacently to the energy storage device 1; and a first projecting portion (outer contact portion) 24B which projects toward the end plate 30 from the base 20B, and is in contact with the end plate 30.

With this configuration, the spacer 2B is in contact with the end plate 30 at the distal end (the distal end in the projecting direction) of the first projecting portion 24B so that a gap is formed between the base 20B and the end plate 30. Accordingly, a contact area between the spacer 2B and the end plate 30 can be reduced. As a result, a foreign material is minimally caught between the end plate 30 and the spacer 2B.

In this embodiment, the holder 3 includes the connecting member 31. The connecting member 31 is arranged on the energy storage device 1 along the direction where the energy storage devices 1 and the end plates 30 are adjacently arranged, and the connecting member 31 has the fixing portions 313 connected to the end plates 301. The first projecting portion 24B is arranged at least between the fixing portion 313 and the base 20B.

With this configuration, when a force in the direction from the end plate 30 to the energy storage device 1 is applied to the end plate 30 by the connecting member 31, such a force is efficiently transmitted to the energy storage devices 1 from the end plate 30 through the spacer 2B (to be more specific, the first projecting portion 24B).

In this embodiment, the spacer (outer spacer) 2B includes the second projecting portion (inner contact portion) 201B which projects from the base 20B toward the energy storage device 1 and is in contact with the energy storage device 1, and the second projecting portion 201B is arranged at a position where the second projecting portion 201B overlaps with the first projecting portion 24B in the first direction.

With this configuration, a gap is formed between the spacer 2B and the energy storage device 1 and hence, heat generated by the energy storage device 1 can be easily discharged to the outside (outside the energy storage apparatus). Further, the first projecting portion 24B and the second projecting portion 201B overlap with each other in the first direction (X axis direction) with the base 20B interposed therebetween. Accordingly, when a force in the direction from the end plate 30 to the energy storage device 1 is applied to the end plate 30 by the connecting member 31 along the first direction, such a force is efficiently transmitted to the energy storage device 1.

In this embodiment, the base 20B of the spacer (outer spacer) 2B expands in the directions (Y axis direction and the Z axis direction) orthogonal to the first direction (X axis direction). The first projecting portion 24B is formed of a plurality of first projecting portions 24B, and the plurality of first projecting portions 24B are projecting ridges arranged parallel to each other in a spaced-apart manner in the direction (Z axis direction) orthogonal to the first direction. The second projecting portion 201B is formed of a plurality of second projecting portions 201B, and the plurality of second projecting portions 201B are projecting ridges which extend in the same direction as the direction that the first projecting portions 24B extend, at positions where the plurality of second projecting portions 201B overlap with and the plurality of first projecting portions 24B in the first direction (X axis direction).

With this configuration, a plurality of passages (spaces each of which is defined between the first projecting portions 24B arranged adjacent to each other) which extend in one direction (Y axis direction) and allow air to pass therethrough are defined between the spacer 2B and the energy storage device 1 and, at the same time, the plurality of first projecting portions 24B and the plurality of second projecting portions 201B are in contact with the energy storage device 1 and the end plate 30. Accordingly, air is made to flow through the passage while ensuring a sufficient efficiency of transmitting a force to the energy storage device 1 from the end plate 30 so that a cooling efficiency of the energy storage device 1 can be enhanced.

In this embodiment, the length of the first projecting portion (outer contact portion) 24B in the projecting direction is shorter than the length of the second projecting portion (inner contact portion) 201B in the projecting direction.

With this configuration, the base 20B is arranged on a position closer to the end plate 30 so that a distance between the base 20B and the energy storage device 1 is increased. Accordingly, a plurality of passages which allow a sufficient amount of air to pass therethrough are defined between the spacer 2B and the energy storage device 1.

In this embodiment, the end plate 30 is made of a metal material. Thermal conductivity of metal is higher than thermal conductivity of a resin so that when the end plate 30 is made of metal, heat outside the energy storage apparatus is easily transferred to an energy storage device 1 side. However, in the energy storage apparatus having the above-mentioned configuration, a gap (space which allows air to pass therethrough) is formed between the end plate 30 and the spacer (outer spacer) 2B and hence, even when the end plate 30 is made of metal, heat transferred to the energy storage device 1 side from the outside through the end plate 30 is minimally transferred to the energy storage device 1.

Further, by forming the end plate 30 using metal, the thickness of the end plate can be reduced while ensuring a sufficient strength of the end plate 30. Accordingly, a miniaturization of the energy storage apparatus can be achieved.

In this embodiment, the spacer (outer spacer) 2B has a fitting portion 23B in which the end plate 30 is fitted at a position of the base 20B which faces the end plate 30 in an opposed manner. With this configuration, relative positions of the end plate 30 and the spacer 2B can be surely controlled.

In this embodiment, a gap is formed between the first projecting portion (outer contact portion) 24B and the fitting portion 23B. With this configuration, when the end plate 30 and the fitting portions 23B of the spacer 2B engage with each other by fitting engagement, a foreign material generated due to the rubbing between the end plate 30 and the fitting portion 23B is escaped to the gap. Accordingly, the foreign material generated due to the rubbing is minimally caught between the first projecting portion 24B and the end plate 30.

In this embodiment, an area of a portion of the first projecting portion (outer contact portion) 24B which is in contact with the end plate 30 is smaller than a cross-sectional area of the end portion of the first projecting portion on the base side. In this manner, by making the area of the portion of the first projecting portion 24B at a distal end in the projecting direction which is in contact with the end plate 30 smaller than a proximal portion (portion on the base 20B side) of the first projecting portion 24B, a foreign material is more minimally caught between the end plate 30 and the spacer 2B.

It is needless to say that the present invention is not limited to the above-mentioned embodiment, and various modifications are conceivable without departing from the gist of the present invention.

In the above-mentioned embodiment, the outer spacer 2B has the second projecting portions (inner contact portions) 201B which are in contact with the energy storage device 1. However, the configuration of the outer spacer 2B is not limited to the configuration that the outer spacer 2B includes the second projecting portions (inner contact portions) 201B which are in contact with the energy storage device 1. For example, the outer spacer 2B may be configured such that the base 20B is directly brought into contact with the energy storage device 1. That is, the second projecting portions (inner contact portions) 201B are formed when necessary such as when passages are to be formed between the outer spacer 2B and the energy storage device 1.

In the above-mentioned embodiment, the outer spacer 2B has the fitting portions 23B which engage with the end plate 30 in fitting engagement at a position which faces the end plate 30 so as to perform alignment of the outer spacer 2B relative to the end plate 30. However, the configuration of the outer spacer 2B is not limited to the configuration that the outer spacer 2B has the fitting portions 23B at the position which faces the end plate 30. The alignment of the outer spacer 2B relative to the end plate 30 may be performed by constitutional parts other than the fitting portions 23B. For example, the relative alignment between the outer spacer 2B and the end plate 30 may be performed by making the end plate 30 engage with the positioning portions 22B (plurality of members 220B) of the outer spacer 2B by fitting engagement.

In the above-mentioned embodiment, the outer spacer 2B has the plurality of first projecting portions (outer contact portions) 24B. However, the configuration of the outer spacer 2B is not limited to the configuration that the outer spacer 2B includes the plurality of first projecting portions (outer contact portions) 24B. For example, the outer spacer 2B may include one first projecting portion (outer contact portion) 24B. That is, it is sufficient that the outer spacer 2B includes at least one first projecting portion (outer contact portion) 24B at a position where the outer spacer 2B can transmit a force to the end plate 30.

In the above-mentioned embodiment, a gap is formed between the first projecting portion (outer contact portion) 24B of the outer spacer 2B and the fitting portion 23B. However, the configuration of the outer spacer 2B is not limited to the configuration that the gap is formed between the first projecting portion (outer contact portion) 24B of the outer spacer 2B and the fitting portion 23B. For example, the first projecting portion (outer contact portion) 24B of the outer spacer 2B and the fitting portion 23B may be connected to each other without forming a gap therebetween.

In the above-mentioned embodiment, the first projecting portions (outer contact portions) 24B of the outer spacer 2B are arranged between the base 20B of the outer spacer 2B and the fixing portions 313 of the connecting member 31. However, the configuration of the outer spacer 2B is not limited to the configuration that the first projecting portions (outer contact portions) 24B of the outer spacer 2B are arranged between the base 20B of the outer spacer 2B and the fixing portions 313 of the connecting member 31. For example, the first projecting portions (outer contact portions) 24B of the outer spacer 2B may be formed so as to avoid a space formed between the base 20B of the outer spacer 2B and the fixing portion 313 of the connecting member 31. Here, the first projecting portions (outer contact portions) 24B are provided for transmitting a holding force of the holder 3 so that it is preferable that the first projecting portions 24B be arranged in the vicinity of the fixing portions 313 which are positions to which a force is applied.

In the above-mentioned embodiment, the outer spacer 2B has the first projecting portions (outer contact portions) 24B at positions corresponding to the second projecting portions (inner contact portions) 201B. However, the configuration of the outer spacer 2B is not limited to the configuration that the outer spacer 2B has the first projecting portions (outer contact portions) 24B at positions corresponding to the second projecting portions (inner contact portions) 201B. For example, the first projecting portions (outer contact portions) 24B may be formed at positions which do not overlap with the second projecting portions (inner contact portions) 201B. Further, the first projecting portions (outer contact portions) 24B are not limited to the projecting ridges. For example, the first projecting portions (outer contact portions 24B) may be formed of projections which are formed by partially bulging the outer spacer 2B.

In the above-mentioned embodiment, a projecting amount of the first projecting portion (outer contact portion) 24B is set larger than a projecting amount of the second projecting portion (inner contact portion) 201B. However, the configuration is not limited to the configuration that the projecting amount of the first projecting portion (outer contact portion) 24B is set larger than the projecting amount of the second projecting portion (inner contact portion) 201B. For example, the projecting amount of the first projecting portion (outer contact portion) 24B may be set equal to the projecting amount of the second projecting portion (inner contact portion) 201B. Alternatively, the projecting amount of the first projecting portion (outer contact portion) 24B may be set smaller than the projecting amount of the second projecting portion (inner contact portion) 201B. Here, when the projecting amount of the first projecting portion (outer contact portion) 24B is increased, a distance between the end plate 30 and the base 20B of the outer spacer 2B becomes large so that an energy storage apparatus is increased in size. In view of the above, it is sufficient that the projecting amount of the first projecting portion (outer contact portion) 24B is set to a necessary minimum projecting amount.

In the above-mentioned embodiment, the end plate 30 is made of a metal material. However, the configuration is not limited to the configuration that the end plate 30 is made of a metal material. For example, the end plate 30 may be made of a resin provided that the end plate 30 can ensure a sufficient strength.

In the above-mentioned embodiment, an area of the portion of the first projecting portion (outer contact portion) 24B which is in contact with the end plate 30 is set smaller than a cross-sectional area of the end portion of the first projecting portion 24B on a base 20B side. However, the configuration is not limited to the above. For example, the area of the portion of the first projecting portion (outer contact portion) 24B which is in contact with the end plate 30 may be set equal to the cross-sectional area of the end portion of the first projecting portion 24B on a base 20B side. Alternatively, the area of the portion of the first projecting portion (outer contact portion) 24B which is in contact with the end plate 30 may be set larger than the cross-sectional area of the end portion of the first projecting portion 24B on the base 20B side.

In the above-mentioned embodiment, the base 20B of the outer spacer 2B has an approximately rectangular shape, and has a size substantially equal to the size of the first wall 100*c* of the energy storage device 1. However, the shape of the base 20B of the outer spacer 2B is not limited to the approximately rectangular shape, and the size of the base 20B is also not limited to the size substantially equal to the size of the first wall 100*c* of the energy storage device 1. It is sufficient that the base 20B of the outer spacer 2B is configured such that the postures of the energy storage device 1 and the end plate 30 which are arranged adjacently to each other correspond to each other.

In the above-mentioned embodiment, the restricting portion 21B is formed at the respective corner portions of the base 20B of the outer spacer 2B. However, the configuration of the restricting portion 21B of the outer spacer 2B is not limited to the configuration that the restricting portion 21B is formed at the respective corner portions of the base 20B of the outer spacer 2B. Provided that the restricting portions 21B of the outer spacer 2B serve for alignment of the energy storage device 1 relative to the base 20B, the restricting portions 21B of the outer spacer 2B may be formed at positions other than the corner portions of the base 20B.

In the above-mentioned embodiment, the base 20A of the inner spacer 2A has an approximately rectangular shape, and has a size substantially equal to the size of the first wall 100*c* of the energy storage device 1. However, provided that the base 20A of the inner spacer 2A is configured so as to make respective postures of every two energy storage devices 1 arranged adjacently to the inner spacer 2A correspond to each other, the shape of the base 20A of the inner spacer 2A is not limited to the approximately rectangular shape, and the size of the base 20A of the inner spacer 2A is also not limited to the size substantially equal to the size of the first wall 100*c* of the energy storage device 1.

In the above-mentioned embodiment, the passages are formed between the base 20A of the inner spacer 2A and the energy storage device 1 by forming the base 20A into a rectangular corrugated shape. However, the configuration of the base 20A of the inner spacer 2A is not limited to the configuration that the base 20A has the rectangular corrugated shape. That is, it is sufficient to adopt the configuration where, in cooling the energy storage devices 1, a fluid is allowed to pass through between the first surface of the base 20A of the inner spacer 2A and the energy storage device 1 (between the second surface and the energy storage device 1) (for example, the first surface and the second surface each have an uneven shape). On the other hand, when it is unnecessary to cool the energy storage devices 1 (when it is unnecessary to form passages between the base 20A of the inner spacer 2A and the energy storage device 1), the base 20A of the inner spacer 2A may be formed into a flat plate shape.

In the above-mentioned embodiment, the restricting portions 21A of the inner spacer 2A are formed at the respective corner portions of the base 20A. However, the configuration is not limited to the configuration that the restricting portions 21A of the inner spacer 2A are formed at the respective corner portions of the base 20A. Provided that the restricting portions 21A of the inner spacer 2A serve for alignment of the energy storage device 1 relative to the base 20A, the restricting portions 21A may be formed at positions other than the corner portions of the base 20A.

What is claimed is:

1. An energy storage apparatus comprising:

a plurality of energy storage devices arranged in a first direction, the energy storage devices including two end energy storage devices and energy storage devices arranged between the two end energy storage devices;

an inner spacer arranged between the energy storage devices; and an outer spacer arranged at an end of the energy storage devices, wherein the inner spacer defines an inner passage with the energy storage device adjacently arranged to the inner spacer on one side in the first direction, wherein the outer spacer defines an outer passage with an end energy storage device of the two end energy storage devices, wherein a relation $qo/qi>1$ is satisfied, where qo is a mean value of heat transfer amounts transferred from the end energy storage devices to a fluid passing the inner and outer passages of the two end energy storage devices, qi is a mean value of heat transfer amounts transferred from the energy storage devices arranged between the two end energy storage devices to a fluid passing the inner passages, wherein the inner spacer includes:

a first abutting portion which is formed along and in contact with the energy storage device arranged adjacently to the inner spacer on one side in the first direction; and a second abutting portion which is formed along and in contact with the energy storage device arranged adjacently to the inner spacer on an other side in the first direction, and wherein the first and the second abutting portions do not overlap with each other as viewed in a second direction perpendicular to the first direction.

2. The energy storage apparatus according to claim 1, wherein the outer passage is set larger than the inner passage in cross-sectional area in a direction orthogonal to a direction along which the fluid flows.

3. The energy storage apparatus according to claim 1, wherein a cooling area for the energy storage device in the outer passage is set larger than a cooling area for the energy storage device in the inner passage.

4. The energy storage apparatus according to claim 1, wherein the outer spacer comprises a pair of outer spacers arranged to sandwich both ends of the energy storage devices in the first direction, wherein the inner spacer comprises a plurality of inner spacers each of which is arranged between the energy storage devices arranged adjacently to each other in the first direction, wherein each of the inner passages defined by the plurality of inner spacers have the same or substantially the same cross-sectional area in the direction orthogonal to the direction along which the fluid flows, and wherein each of the outer passages defined by the pair of outer spacers is larger than the inner passage in cross-sectional area in the direction orthogonal to the direction along which the fluid flows.

5. The energy storage apparatus according to claim 1, wherein the outer spacer includes:

an opposedly-facing portion which is arranged in a spaced-apart manner from the energy storage device arranged adjacently to the outer spacer in the first direction; and a plurality of contact portions extending toward the energy storage device from the opposedly-facing portion, wherein the inner spacer includes:

a plurality of joint portions connecting the first and second abutting portions, and wherein the plurality of contact portions of the outer spacer and the plurality of joint portions of the inner spacer are arranged at positions where the contact portions and the joint portions overlap with each other as viewed in the first direction.

6. An energy storage apparatus comprising:

a plurality of energy storage devices arranged in a first direction, the energy storage devices including two end energy storage devices and energy storage devices arranged between the end energy storage devices;

an inner spacer arranged between the energy storage devices; and an outer spacer arranged at an end of the energy storage devices, wherein the inner spacer defines an inner passage with the energy storage device adjacently arranged to the inner spacer on one side in the first direction, wherein the outer spacer defines an outer passage with an end energy storage device of the two end energy storage devices, wherein a relation $A_0 \times \sqrt{a_0} > A_i \times \sqrt{a_i}$ is satisfied, where $A_0$ is a mean value of cooling areas for the end energy storage devices arranged at both ends in the first direction, $A_i$ is a mean value of cooling areas for the energy storage devices arranged between the end energy storage devices, $a_0$ is a mean value of cross-sectional areas of the outer passages and inner passages arranged adjacently to the end energy storage devices, and $a_i$ is a mean value of cross-sectional areas of the inner passages arranged adjacently to the energy storage devices arranged between the end energy storage devices.

7. The energy storage apparatus according to claim 1, wherein the outer spacer includes:

a base arranged adjacently to the energy storage device; and a first projecting portion which projects toward an end plate from the base, and is in contact with the end plate.

8. The energy storage apparatus according to claim 6, wherein the outer spacer includes:

a base arranged adjacently to the energy storage device; and a first projecting portion which projects toward an end plate from the base, and is in contact with the end plate.

9. An energy storage apparatus comprising:

a plurality of energy storage devices arranged in a first direction, the plurality of energy storage devices including:

first and second end energy storage devices;

other energy storage devices formed between the first and second end energy storage devices, and including first and second energy storage devices; and an inner spacer arranged between the first and second energy storage devices, the inner spacer defining inner passages comprising:

a first inner passage formed with the first energy storage device which is adjacent to a first side of the inner spacer in the first direction; and a second inner passage formed with the second energy storage device which is adjacent to a second side of the inner spacer in the first direction;

an outer spacer arranged at an end of the plurality of energy storage devices, the outer spacer defining an outer passage with the first end energy storage device, wherein a relation $qo/qi > 1$ is satisfied, where qo is a mean value of heat transfer amounts transferred from the first and second end energy storage devices to a fluid passing the inner and outer passages adjacent to the first and second end energy storage devices, qi is a mean value of heat transfer amounts transferred from the other energy storage devices to a fluid passing the inner passages, wherein the inner spacer includes:

a first abutting portion which is formed along and in contact with the first energy storage device; and a second abutting portion which is formed along and in contact with the second energy storage device, and wherein the first and the second abutting portions do not overlap with each other as viewed in a second direction perpendicular to the first direction.

10. The energy storage apparatus of claim 9, wherein the outer spacer comprises:

an opposedly-facing portion which is arranged in a spaced-apart manner from the first end energy storage device.

11. The energy storage apparatus of claim 10, wherein the outer spacer further comprises:

a plurality of contact portions extending in the second direction and protruding in the first direction from the opposedly-facing portion toward the first end energy storage device.

12. The energy storage apparatus of claim 11, wherein the first abutting portion comprises a plurality of first abutting portions, and the second abutting portion comprises a plurality of second abutting portions, and wherein the plurality of first abutting portions are alternately arranged with the plurality of second abutting portions in a third direction perpendicular to the first and second directions.

13. The energy storage apparatus of claim 12, wherein the inner spacer further comprises:

a plurality of joint portions formed between the plurality of first abutting portions and the plurality of second abutting portions, and aligned in the first direction with the plurality of contact portions.

14. The energy storage apparatus of claim 9, wherein the inner spacer further comprises:

a base including the first and second abutting portions; and a restricting portion formed on a corner of the base and including a first portion projecting in the first direction toward the first energy storage device and a second portion projecting in the first direction toward the second energy storage device.

15. The energy storage apparatus of claim 9, wherein the inner spacer further comprises a joint portion projecting in the first and second directions and connecting the first and second abutting portions.

16. The energy storage apparatus of claim 9, wherein the inner spacer further comprises a first joint portion formed at a first end of the second abutting portion, and a second joint portion formed at a second end of the second abutting portion, and the first inner passage is defined by the first and second joint portions, the second abutting portion and a sidewall of the first energy storage device.

17. The energy storage apparatus of claim 9, further comprising:

a holder including a first end plate formed on a side of outer spacer which is opposite the first end energy storage device.

18. The energy storage apparatus of claim 17, further comprising:

another outer spacer arranged at an other end of the plurality of energy storage devices, the other outer spacer defining an outer passage with the second end energy storage device, wherein the holder further comprises:

a second end plate formed on a side of the other outer spacer which is opposite the second end energy storage device; and a pair of frames which connect the first end plate to the second end plate.

19. The energy storage apparatus of claim 18, wherein the first end plate comprises a first pressure contact portion for contacting the outer spacer, and the second end plate comprises a second pressure contact portion for contacting the other outer spacer.

* * * * *